United States Patent
Suzuki et al.

(10) Patent No.: US 7,324,326 B2
(45) Date of Patent: Jan. 29, 2008

(54) ELECTRONIC DEVICE AND THE PRODUCTION METHOD

(75) Inventors: Kazutaka Suzuki, Chuo-ku (JP); Shigeki Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 277 days.

(21) Appl. No.: 10/544,008

(22) PCT Filed: Feb. 3, 2004

(86) PCT No.: PCT/JP2004/001047

§ 371 (c)(1),
(2), (4) Date: Aug. 1, 2005

(87) PCT Pub. No.: WO2004/070748

PCT Pub. Date: Aug. 19, 2004

(65) Prior Publication Data

US 2006/0138590 A1    Jun. 29, 2006

(30) Foreign Application Priority Data

Feb. 5, 2003  (JP)  ............................. 2003-028713
Jun. 24, 2003  (JP)  ............................. 2003-179807

(51) Int. Cl.
*H01G 4/06*  (2006.01)
(52) U.S. Cl. ............................... 361/321.1; 361/321.1; 361/321.4; 361/306.1; 361/306.3; 361/311; 361/313; 252/62.2; 429/40; 429/44; 429/46

(58) Field of Classification Search ............. 361/321.1, 361/321.2, 311–313, 306.1, 306.3, 302–305, 361/301.1, 321.4; 429/40, 44, 46; 525/62.2; 502/325–326, 337–339
See application file for complete search history.

(56) References Cited

U.S. PATENT DOCUMENTS

| | | | | |
|---|---|---|---|---|
| 5,518,833 | A * | 5/1996 | Repplinger et al. | 429/59 |
| 5,877,934 | A * | 3/1999 | Sano et al. | 361/312 |
| 6,002,577 | A * | 12/1999 | Wada et al. | 361/312 |
| 6,185,087 | B1 * | 2/2001 | Park et al. | 361/321.4 |
| 6,280,882 | B1 * | 8/2001 | Vallee et al. | 429/303 |
| 6,723,678 | B2 * | 4/2004 | Gorer | 502/326 |
| 6,905,796 | B2 * | 6/2005 | Ishida et al. | 429/209 |
| 6,977,806 | B1 * | 12/2005 | Sakashita | 361/321.2 |

FOREIGN PATENT DOCUMENTS

| | | |
|---|---|---|
| JP | A 62-171107 | 7/1987 |
| JP | A 1-321615 | 12/1989 |
| JP | A 3-126206 | 5/1991 |
| JP | A 5-121204 | 5/1993 |
| JP | A 7-176448 | 7/1995 |
| JP | A 10-214520 | 8/1998 |

(Continued)

*Primary Examiner*—Nguyen T. Ha
(74) *Attorney, Agent, or Firm*—Oliff & Berridge, PLC

(57) ABSTRACT

An electronic device having an element body comprising an internal electrode layer, wherein the internal electrode layer includes an alloy, the alloy contains a nickel (Ni) element and at least one kind of element selected from ruthenium (Ru), rhodium (Rh), rhenium (Re) and platinum (Pt), and a content of each component is Ni: 80 to 100 mol % (note that 100 mol % is excluded) and a total of Ru, Rh, Re and Pt: 0 to 20 mol % (note that 0 mol % is excluded).

24 Claims, 6 Drawing Sheets

FOREIGN PATENT DOCUMENTS

| | | |
|---|---|---|
| JP | A 11-54368 | 2/1999 |
| JP | A 2001-511607 | 8/2001 |
| JP | A 2002-110444 | 4/2002 |
| JP | A 2002-198255 | 7/2002 |
| JP | A 2002-348603 | 12/2002 |
| JP | A 2003-7562 | 1/2003 |
| JP | A 2003-013103 | 1/2003 |
| WO | WO 99/05786 | 2/1999 |

* cited by examiner

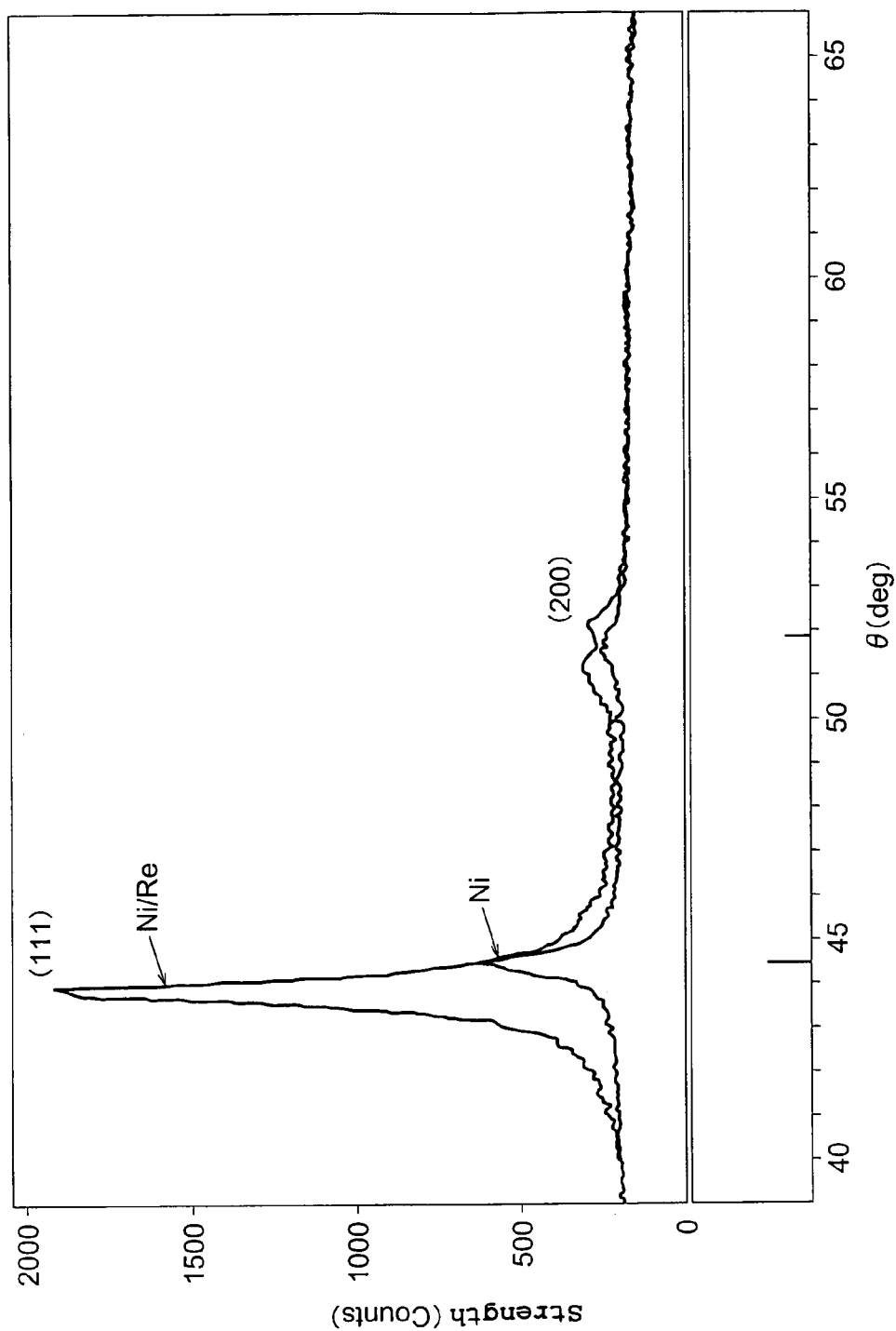

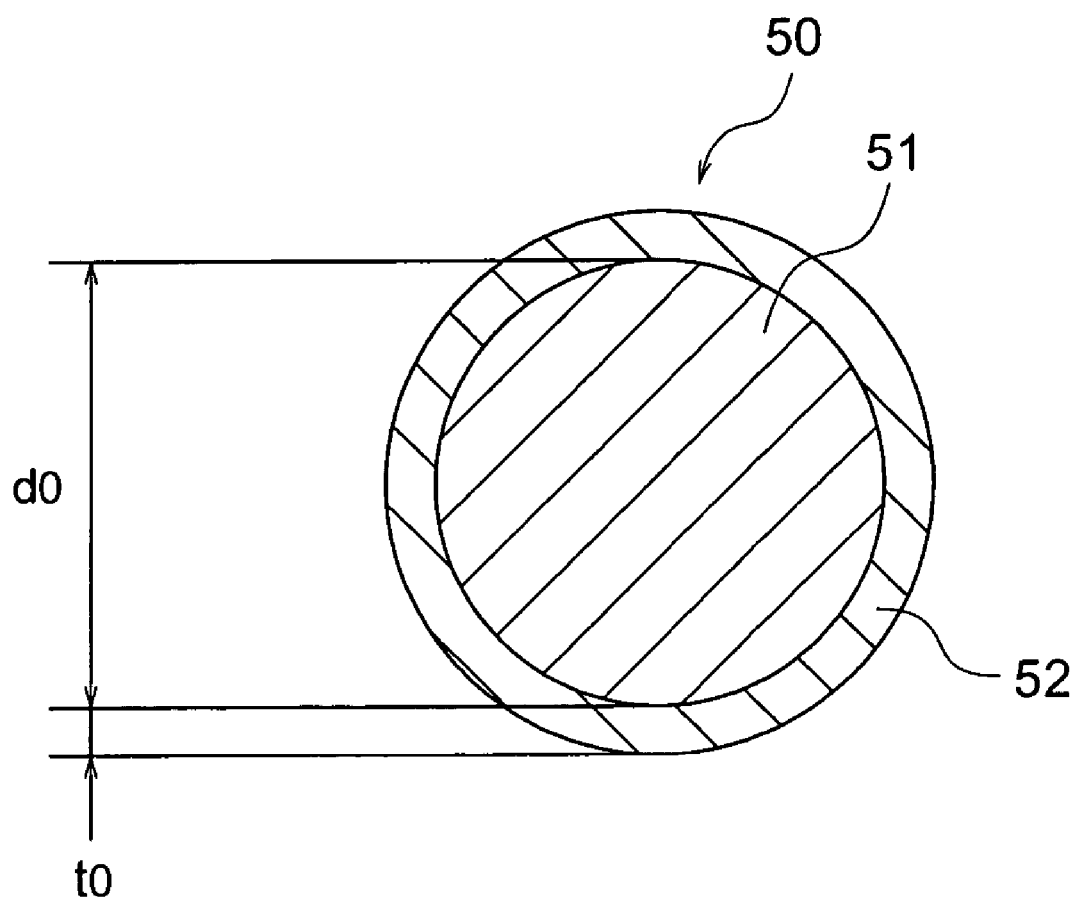

ELECTRONIC DEVICE AND THE PRODUCTION METHOD

TECHNICAL FIELD

The present invention relates to an electronic device, such as a multilayer ceramic capacitor.

BACKGROUND ART

A multilayer ceramic capacitor as an example of electronic devices is composed of an element body having a multilayer structure, wherein a plurality of dielectric layers and internal electrode layers are alternately arranged, and a pair of external terminal electrodes formed on both end portions of the element body.

To produce the multilayer ceramic capacitor, first, a pre-firing element body is produced by alternately stacking a plurality of pre-firing dielectric layers and pre-firing internal electrode layers by exactly necessary numbers, then, after firing this, a pair of external terminal electrodes are formed at both end portions of the fired element body.

A ceramic green sheet is used as the pre-firing dielectric layer, and an internal electrode paste in a predetermined pattern and a metal thin film, etc. are used as the pre-firing internal electrode layer.

The ceramic green sheet can be produced by the sheet method and orientation method, etc. The sheet method is a method of producing by applying a dielectric coating material including dielectric powder, a binder, plasticizer and organic solvent, etc. on a carrier sheet, such as PET, by using the doctor blade method, etc., heating and drying. The orientation method is a method of producing by performing biaxial orientation on a film shaped molded item obtained by extruding performing extrusion molding on a dielectric suspension wherein dielectric powder and a binder are mixed in a solvent.

The internal electrode paste layer in a predetermined pattern is produced by the printing method. The printing method is a method of applying and forming a conductive material including metal, such as Pd, Ag—Pd and Ni, and a conductive coating material including a binder and an organic solvent, etc. to be a predetermined pattern on a ceramic green sheet. A metal thin film having a predetermined pattern is produced by a thin film method, such as sputtering.

As explained above, when producing a multilayer ceramic capacitor, the pre-firing dielectric layers and the pre-firing internal electrode layers are fired at a time. Therefore, the conductive material included in the pre-firing internal electrode layer is required to have a higher melting point than a sintering temperature of a dielectric powder included in the pre-firing dielectric layer, not to react with the dielectric powder, and not to be dispersed in a fired dielectric layer, etc.

Conventionally, to satisfy the demands, Pt, Pd and other precious metals are used as the conductive material included in the pre-firing internal electrode layer. However, precious metals themselves are expensive, so that there is a disadvantage that a finally obtained multilayer ceramic capacitor becomes costly. Thus, conventionally, the sintering temperature of the dielectric powder was lowered to 900 to 1100° C., and an Ag—Pd alloy, Ni and other inexpensive base metals are used as the conductive material included in the pre-firing internal electrode layer.

In recent years, as a variety of electronic equipments become more compact, electronic devices to be installed inside the electronic equipments have become more compact and larger in capacity. To pursue a more compact multilayer ceramic capacitor having a larger capacity, it is required to stack thin internal electrode layers with less defectives, not to mention the dielectric layers.

However, when taking the case of using Ni as the conductive material included in the pre-firing internal electrode layer as an example, the Ni has a lower melting point than that of the dielectric powder included in the pre-firing dielectric layer. Accordingly, when firing the both at a time, there arises a big difference between their sintering temperatures. When sintering at a high-temperature in the case where there is a big difference between sintering temperatures, cracks and delamination of the internal electrode layers arise, while when sintering at a low temperature, a firing defect of the dielectric powder may arise.

Also, when a thickness of the pre-firing internal electrode layer becomes thinner, during firing in a reducing atmosphere, Ni particles included in the conductive material become spherical due to grain growth and gaps arise between adjacent Ni particles, which are connected to each other before firing, and vacancy is generated at any part, as a result, it becomes difficult to form a continuous fired internal electrode layer. When the internal electrode layer after firing is not continuous, there is a problem that a capacitance of a multilayer ceramic capacitor declines.

The Japanese Unexamined Patent Publication No. 3-126206 describes a method of alloying internal electrode layers to prevent breaking of internal electrodes. Note that in the Japanese Unexamined Patent Publication No. 3-126206, it is considered that control of alloying is difficult in the thin film formation method and an internal electrode layer is prepared as a metal multilayer film, and alloying is performed after a firing step.

However, the Japanese Unexamined Patent Publication No. 3-126206 does not disclose what kind of metal is used for alloying when using an internal electrode including nickel as the main component to suppress grain growth of nickel particles in the firing step, so that it is possible to prevent them from becoming spherical and prevent electrodes from breaking. Depending on compositions of respective multilayer metal films, the sintering temperature adversely becomes low and grain growth of the nickel particles cannot be suppressed in the firing step.

Also, when a metal film contacting ceramic is poor in a wettability and adhesiveness in the configuration of each multilayer metal film, spheroidizing and breaking adversely proceed and a capacitance as a capacitor declines.

Also, the Japanese Unexamined Patent Publication No. 10-214520 proposes a conductive paste containing nickel as the main component and metallocene expressed by a general formula $M[(C_5H_5)_2]$ (M is at least one kind of Ru, Os, Pd, Cr and Co).

However, in the Japanese Unexamined Patent Publication No. 10-214520, since the conductive paste contains an organic metal compound, there is a problem that organic components are decomposed by a catalytic action and cracks arise on an element body, etc. Particularly, when an adding quantity of the organic metal compound exceeds 0.1 mol % as a metal amount, particularly, the incidence of cracks tends to become high.

DISCLOSURE OF THE INVENTION

The present invention was made in consideration of the above circumstances and has as an object thereof to provide an electronic device, such as a multilayer ceramic capacitor, and the production method capable of suppressing grain growth of Ni particles in a firing step, effectively preventing spheroidizing, breaking of electrodes and arising of cracks and effectively preventing a decline of a capacitance particularly even when a thickness of an internal electrode layer becomes thin.

To attain the above object, an electronic device according to the present invention is an electronic device having an element body comprising an internal electrode layer, wherein the internal electrode layer contains an alloy;
the alloy contains
nickel (Ni), and
at least one kind of element selected from a group of ruthenium (Ru), rhodium (Rh), rhenium (Re) and platinum (Pt); and
a content of each component is
Ni: 80 to 100 mol % (note that 100 mol % is excluded), and
a total of Ru, Rh, Re and Pt: 0 to 20 mol % (note that 0 mol % is excluded).

Preferably, the element body has a multilayer configuration wherein a plurality of dielectric layers and internal electrode layers are alternately arranged.

Preferably, a content of each component is
Ni: 87 to 99.9 mol %, and
a total of Ru, Rh, Re and Pt: 0.1 to 13 mol %.

Preferably, the alloy includes at least one kind of element selected from the group of rhodium (Rh), rhenium (Re) and platinum (Pt). Ru tends to be dispersed as an oxide in the dielectric layer. Therefore, when the internal electrode layer is composed of an alloy containing Ru, the end portions of the internal electrode layers are oxidized, and some problem may arise when forming terminal electrodes depending on the production process. Therefore, Rh, Re and Pt are particularly preferable.

When mol % of Ni is too large, effects of the present invention tend to become small, while when too small, it is liable that disadvantages increase, such that the resistivity becomes high and the dielectric loss tanσ increases, etc.

Preferably, the internal electrode layer includes an alloy; and when assuming that peak strength of a diffraction line on a crystal plane (111) is I(111), peak strength of a diffraction line on a crystal plane (200) is I(200), and peak strength of a diffraction line on a crystal plane (220) is I(220) in an X-ray diffraction chart, the alloy has a main plane satisfying relationships of $(I(111)/I(200)) \geqq 3$ and $(I(111)/I(220)) \geqq 3$.

A production method of an electronic device according to a first aspect of the present invention is for producing an electronic device as set forth in any one of the above, wherein a green chip having an internal electrode layer film formed to be a predetermined pattern by a thin film method is fired to produce the element body.

The thin film method used in the present invention is not particularly limited, and the sputtering method, evaporation method and CVD method, etc. may be mentioned. Among them, the sputtering method and evaporation method are preferable.

Preferably, the internal electrode layer film has a crystalline size of 10 to 100 nm. When the crystalline size is too small, it is liable to cause disadvantages, such as spheroidizing of nickel particles and breaking, while when too large, the film thickness tends to be uneven easily.

A production method of an electronic device according to a second aspect of the present invention is for producing an electronic device as set forth in any one of the above, wherein:

a green chip having an internal electrode layer film (conductive paste film) formed to be a predetermined pattern by the printing method using a paste including alloy powder having an average particle diameter of 0.01 to 1 μm, preferably 0.05 to 0.4 μm is fired to produce the element body.

Preferably, the alloy powder has a crystalline size of 10 to 100 nm. When the crystalline size is too small, it is liable to cause disadvantages, such as spheroidizing of nickel particles and breaking, while when too large, the film thickness tends to be uneven easily.

Preferably, the alloy powder is formed by grinding an alloy film formed by the thin film method (preferably, the sputtering method or the evaporation method).

A production method of an electronic device according to a third aspect of the present invention is for producing an electronic device as set forth in any one of the above, wherein:

a green chip having an internal electrode layer film formed to be a predetermined pattern by the printing method using a paste including conductive particles is fired to produce the element body; wherein the conductive particle includes
a core portion containing nickel as the main component, and
a cover layer covering at least a part around the core portion; and
the cover layer is composed of a metal or an alloy including as the main component at least one kind of element selected from ruthenium (Ru), rhodium (Rh), rhenium (Re) and platinum (Pt).

The method of forming a cover layer around the core portion is not particularly limited in the present invention, and the solution method and thin film method, etc. may be mentioned. As the thin film method, the sputtering method, the evaporation method, the laser ablation method, the arc evaporation method and the radio-frequency plasma CVD method, etc. may be mentioned.

Preferably, the core portion is powder in a spherical shape, a flake shape, a projection form and/or an amorphous shape, wherein a typical length of the particle is in a range of 0.01 μm to 1.0 μm. Note that the typical length of the particles means a diameter when the particles have a spherical shape and, in the case of other shapes, it means the maximum length in the particle shape.

Preferably, a thickness of the cover layer is in a range of 0.1 to 15 nm, in a range of more preferably 0.1 to 13 nm, and particularly preferably in a range of 0.1 to 7 nm. When the cover layer thickness is too thin, the effects of the present invention tend to become small.

Ru, Rh, Re and Pt are precious metals having a higher melting point than that of Ni. Also, the cover layer including these metals or an alloy as the main component has an excellent wettability and adhesiveness with dielectric layers. Accordingly, by forming an internal electrode layer by using conductive particles having a core portion, wherein Ni formed with the cover layer is the main component, it becomes possible to suppress grain growth of Ni particles, effectively prevent spheroidizing and breaking of electrodes, etc. in a firing step and effectively prevent a decline of the capacitance. Also, delamination of the internal electrode layers and the dielectric layers, etc. can be prevented. Furthermore, a firing defect of dielectric powder is not caused.

A production method of an electronic device according to a fourth aspect of the present invention is for producing an electronic device as set forth in any one of the above, comprising the steps of:

forming a sub conductive layer composed of a metal layer or an alloy layer including at least one kind of element selected from ruthenium (Ru), rhodium (Rh), rhenium (Re) and platinum (Pt);

forming a main conductive layer including nickel as the main component by stacking the sub conductive layer; and firing a green chip including an internal electrode layer film comprising the sub conductive layer and main conductive layer.

Preferably, the main conductive layer is sandwiched between a pair of the sub conductive layers, and the internal electrode layer has the configuration that three or more layers are stacked. In the present invention, it is sufficient when the sub conductive layer is formed on at least one side of the main conductive layer, but preferably, the main conductive layer is sandwiched between a pair of the sub conductive layers. By doing so, it is prevented that the main conductive layer contacts the dielectric layer from the both sides and the effects of the present invention are enhanced.

Preferably, the internal electrode layer is stacked on the green sheet, so that the sub conductive layer positions between the main conductive layer and the green sheet in the internal electrode layer. By positioning the sub conductive layer between the main conductive layer and the green sheet, effects of the present invention are enhanced.

Preferably, a thickness of the sub conductive layer is more than 0 μm and 0.1 μm or less, and more preferably 0 μm (0 is not included) to 0.08 μm. Also, a thickness of the main conductive layer is 0.1 μm to 1.0 μm. Furthermore preferably, the thickness of the sub conductive layer is preferably 0 (0 is not included) to 30%, more preferably 0 (0 is not included) to 20% comparing with the thickness of the main conductive layer. Also, a total thickness of the internal electrode layer including a main conductive layer and sub conductive layer is preferably 1 μm or less, and more preferably 0.1 to 0.8 μm. When the thickness of the sub conductive layer is too thin, the effects of the present invention become small, while when it is too thick comparing with a thickness of the main conductive layer, the thickness of the main conductive layer becomes too thin to make the total thickness of the internal electrode layer thin, which is not preferable in terms of attaining a lower resistance.

As explained above, Ru, Rh, Re and Pt are precious metals having a higher melting point than that of Ni. Also, a sub conductive layer containing these metals or an alloy as the main component has an excellent wettability and adhesiveness. Accordingly, by forming the sub conductive layer between a main conductive layer and a dielectric layer, it is possible to suppress grain growth of Ni particles in a firing step, effectively prevent spheroidizing and breaking of electrodes, etc. and effectively prevent a decline of the capacitance. Also, delamination of the internal electrode layers and the dielectric layers, etc. can be prevented. Furthermore, a firing defect of dielectric powder is not caused.

Note that main conductive layer and sub conductive layer adjacent to each other are alloyed after firing to be a single alloy layer.

Preferably, the internal electrode layer is formed on a supporting sheet, then, removed from the supporting sheet and stacked on a green sheet. Preferably, the sub conductive layer is formed by the thin film formation method (the sputtering method, the plating method and the evaporation method, etc.), and the main conductive layer is formed by the printing method or the thin film formation method. When the green sheet and the internal electrode layers are made thinner, it is liable that the internal electrode layer becomes hard to be formed directly on the green sheet. Thus, it is preferable that the internal electrode layer is once formed on a surface of the supporting sheet by the thin film formation method and transferred to the green sheet after that.

Note that the sub conductive layer and the main conductive layer are produced not only by the thin film formation method (the sputtering method, the plating method and the evaporation method, etc.), and the sub conductive layer may be produced by the thin film formation method and the main conductive layer may be formed by the screen printing method by using a Ni conductive paste. In this case, also, grain growth of Ni particles can be suppressed in a firing step in the same way and a decline of a capacitance can be effectively suppressed.

In the production methods of the first to fourth aspects of the present invention, preferably, the green chip is fired in an atmosphere having an oxygen partial pressure of $10^{-10}$ to $10^{-2}$ Pa at the temperature of 1000 to 1300° C. By firing under such a condition, the electronic device of the present invention can be produced.

In the production method of the first to fourth aspects of the present invention, preferably, the element body is annealed in an atmosphere having an oxygen partial pressure of $10^{-2}$ to 100 Pa at the temperature of 1200° C. or lower after a step of firing the green chip. By annealing under a specific annealing condition after the firing explained above, it is possible to attain re-oxidization of the dielectric layer, prevent the dielectric layer from becoming semiconductive, and obtain high insulation resistance.

In the production method of the first to fourth aspects of the present invention, preferably, the internal electrode layer films are stacked with the green sheets and fired at a time.

Note that a material and a production method of the green sheet able to be used in the present invention are not particularly limited, and a ceramic green sheet molded by the doctor blade method and a porous ceramic green sheet obtained by performing biaxial orientation on a film formed by extrusion molding, etc. may be used.

The green sheet is a portion to be a dielectric layer inside the element body after firing. Preferably, the dielectric layer is composed of a dielectric material able to be fired in a reducing atmosphere. Since the internal electrode layer has a first metal portion including nickel as the main component, the dielectric layer is preferably composed of a dielectric material able to be fired in a reducing atmosphere, so as not to be oxidized when being fired at a time.

An adhesive layer may be provided between the internal electrode layer and the green sheet. When the green sheet and the internal electrode layer are made thin, it tends to become difficult to form the internal electrode layer on a surface of the green sheet by the normal printing method, etc., so that the internal electrode layer is preferably stacked on the surface of the green sheet by the transfer method. In this case, bonding of the internal electrode layer and the green sheet tends to become difficult, so that they are preferably adhered by an adhesive layer. Note that the adhesive layer is removed by binder removal processing and/or firing processing on the stacked body.

An electronic device according to the present invention can be produced by any of the above production methods. In the present invention, the electronic device is not particularly limited, and a multilayer ceramic capacitor, a piezoelectric element, a chip inductor, a chip barrister, a chip thermister, chip resistance and other surface mounted device (SMD) chip type electronic devices may be mentioned.

In the electronic device and the production method of the present invention, it is possible to provide an electronic device, such as a multilayer ceramic capacitor, wherein a decline of the capacitance is effectively suppressed.

As explained above, Ru, Rh, Re and Pt have a higher melting point than that of Ni, consequently, a sintering temperature of the conductive material becomes high to be close to a sintering temperature of the dielectric powder. As a result, breaking and delamination of the internal electrode layer is not caused after sintering and a firing defect of the dielectric powder is not caused.

Also, in the production method of the present invention, since an organic metal compound is not used, cracks, etc. do not arise on the element body.

BRIEF DESCRIPTION OF DRAWINGS

FIG. 4 is an X-ray diffraction chart of alloy powder according to an embodiment of the present invention;

FIG. 5 is an enlarged sectional view of a key part of a conductive particle used in a method of another embodiment of the present invention.

BEST MODE FOR CARRYING OUT THE INVENTION

Figure 1:
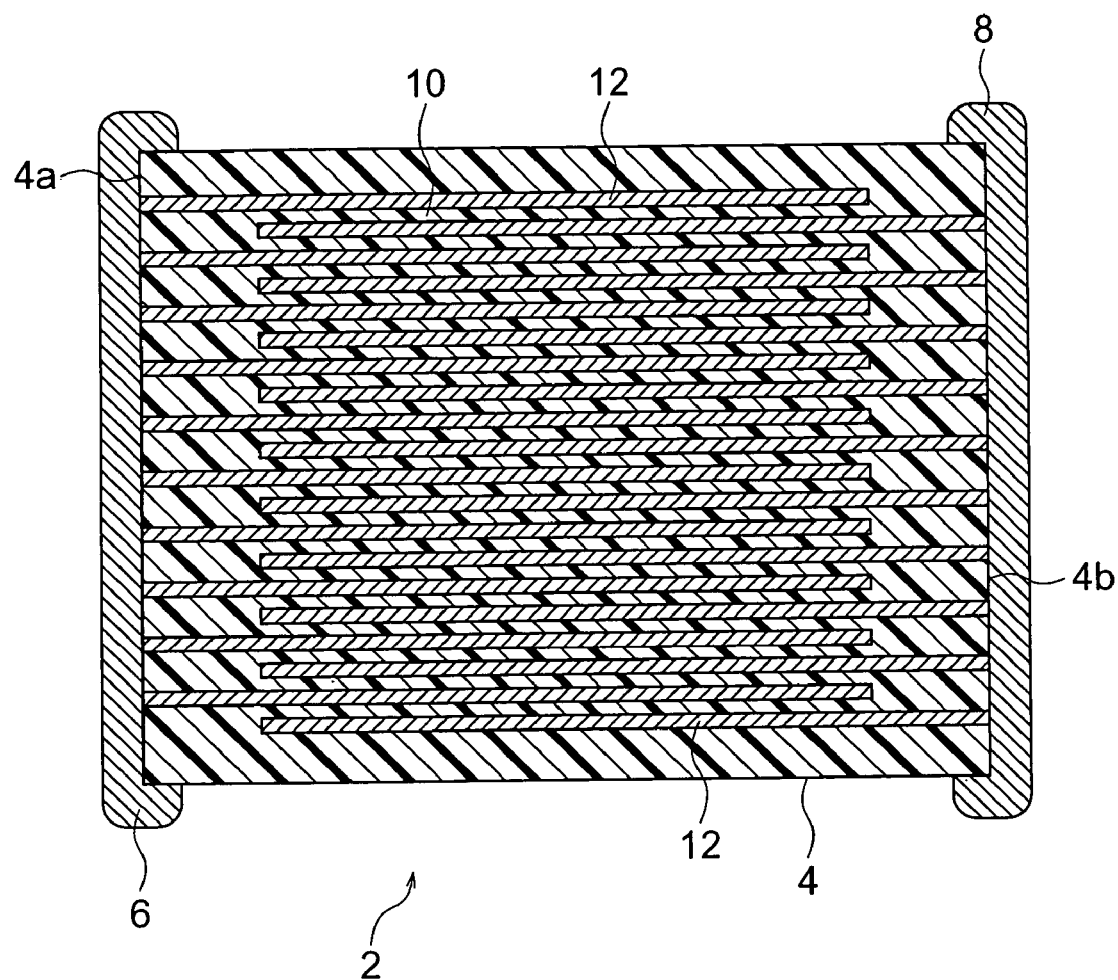
FIG. 1 is a schematic sectional view of a multilayer ceramic capacitor according to an embodiment of the present invention.

Below, the present invention will be explained based on embodiments shown in the drawings.

EMBODIMENT 1

First, as an embodiment of an electronic device according to the present invention, the overall configuration of a multilayer ceramic capacitor will be explained.

As shown in FIG. 1, a multilayer ceramic capacitor 2 according to the present embodiment comprises a capacitor element (element body) 4, a first terminal electrode 6, and a second terminal electrode 8. The capacitor element 4 comprises dielectric layers 10 and internal electrode layers 12, and the internal electrode layers 12 are alternately stacked between the dielectric layers 10. Alternately stacked internal electrode layers 12 on one side are electrically connected to inside the first terminal electrode 6 formed outside of a first end portion 4a of the capacitor element 4. Also, alternately stacked internal electrode layers 12 on the other side are electrically connected to inside of the second terminal electrode 8 formed outside of a second end portion 4b of the capacitor element 4.

The internal electrode layer 12 is composed to include an alloy. The alloy for composing the internal electrode layer 12 includes nickel (Ni) and at least one kind of element selected from ruthenium (Ru), rhodium (Rh), rhenium (Re) and platinum (Pt). A Ni content in the alloy is 80 to 100 mol % (note that 100 mol % is excluded), preferably 87 to 100 mol % (note that 100 mol % is excluded), and more preferably 87 to 99.9 mol %. A total content of Ru, Rh, Re and Pt in the alloy is 0 to 20 mol % (note that 0 mol % is excluded), preferably 0 to 13 mol % (note that 0 mol % is excluded), and more preferably 0.1 to 13 mol %. Note that respective ratios of the elements, Ru, Rh, Re and Pt, may be any. When the total content of Ru, Rh, Re and Pt exceeds 20 mol %, it is liable to bring a disadvantage that the resistivity becomes high, etc. Note that the alloy may include a variety of trace components, such as S, P and C, by about 0.1 mol % or less. Preferable combination is any one of Ni—Rh, Ni—Re and Ni—Pt.

As will be explained in detail later on, the internal electrode layer 12 is formed by being transferred to an internal electrode layer film 12a to a ceramic green sheet 10a, as shown in FIG. 2 to FIG. 3, composed of the same material as that of the internal electrode layer film 12a, and a thickness thereof becomes thicker than that of the internal electrode layer film 12a exactly by an amount of contraction in,the horizontal direction due to firing. A thickness of the internal electrode layer 12 is preferably 0.1 to 1 μm.

A material of the dielectric layer 10 is not particularly limited and, for example, composed of a dielectric material, such as calcium titanate, strontium titanate and/or barium titanate. A thickness of the dielectric layer 10 is not particularly limited but those having a thickness of several μm to several hundreds of μm are general. Particularly, in the present embodiment, it is made thin to be preferably 5 μm or less, and more preferably 3 μm or less.

Also, a material of the terminal electrodes 6 and 8 is not particularly limited and copper, a copper alloy, nickel and a nickel alloy, etc. are normally used. Silver, an alloy of silver and palladium, etc. can be also used. A thickness of the terminal electrodes 6 and 8 is not particularly limited but normally 10 to 50 μm or so.

A shape and size of the multilayer ceramic capacitor 2 may be suitably determined in accordance with the object and use. When the multilayer ceramic capacitor 2 has a rectangular parallelepiped shape, it is normally length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Next, an example of a production method of the multilayer ceramic capacitor 2 will be explained.

First, a dielectric paste is prepared to produce a ceramic green sheet for composing a dielectric layer 10 shown in FIG. 1 after firing.

The dielectric paste is normally composed of an organic solvent based paste or an aqueous paste obtained by kneading a dielectric material and an organic vehicle.

The dielectric material may be suitably selected from, a variety of compounds to become a composite oxide and oxide, for example, carbonate, nitrate, hydroxide, and organic metal compound, and mixed to use. The dielectric material is normally used as powder having an average particle diameter of 0.1 to 3.0 μm or so. Note that to form an extremely thin green sheet, finer powder than the thickness of the green sheet is preferably used.

An organic vehicle is obtained by dissolving a binder in an organic solvent. A binder used for the organic vehicle is not particularly limited and a variety of normal binders, such as ethyl cellulose, polyvinyl butyral and an acrylic resin, are used. Polyvinyl butyral and other butyral based resins are preferably used.

Also, an organic solvent used for the organic vehicle is not particularly limited and terpineol, butyl carbitol, acetone and toluene, etc. are used. Also, a vehicle in the aqueous paste is obtained by dissolving a water soluble binder in water. The water soluble binder is not particularly limited and polyvinyl alcohol, methyl cellulose, hydroxyethyl cellulose, a water soluble acrylic resin and emulsion, etc. are used. A content of each component in the dielectric paste is not particularly limited and may be a normal content of, for example, about 1 to 5 wt % of the binder and about 10 to 50 wt % of the solvent (or water).

The dielectric paste may contain additives selected from a variety of dispersants, plasticizers, dielectrics, glass flit, and insulators, etc. in accordance with need. Note that a total content thereof is preferably 10 wt % or less. When using a butyral based resin as a binder resin, a content of a plasticizer is preferably 25 to 100 parts by weight with respect to 100 parts by weight of the binder resin. When the plasticizer is too little, the green sheet tends to become brittle, while when too much, the plasticizer exudes and handling becomes difficult.

Figure 3A:
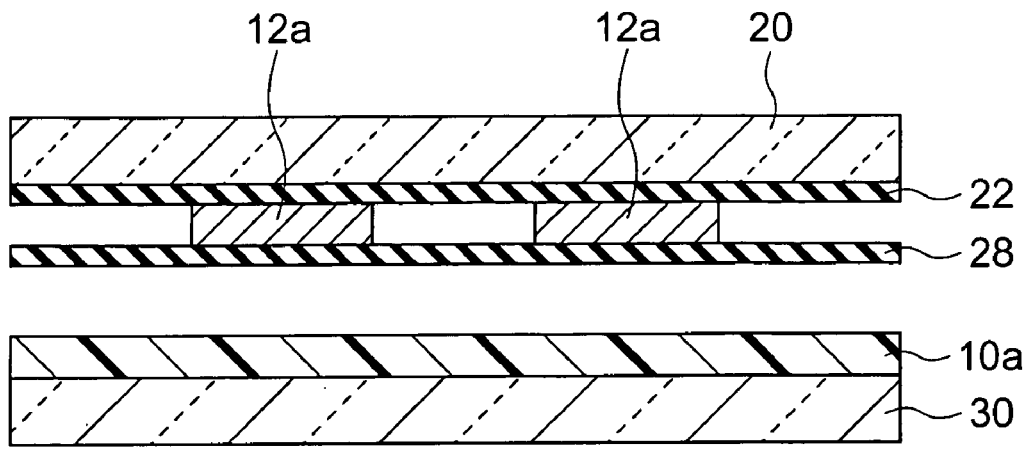

Next, by using the above dielectric paste, for example as shown in FIG. 3A, a green sheet 10a is formed to be a thickness of preferably 0.5 to 30 μm, and more preferably 0.5 to 10 μm or so on the carrier sheet 30 as a second supporting sheet by the doctor blade method, etc. The green sheet 10a is dried after being formed on the carrier sheet 30. Temperature of drying the green sheet 10a is preferably 50 to 100° C. and drying time is preferably 1 to 5 minutes.

Figure 2A:
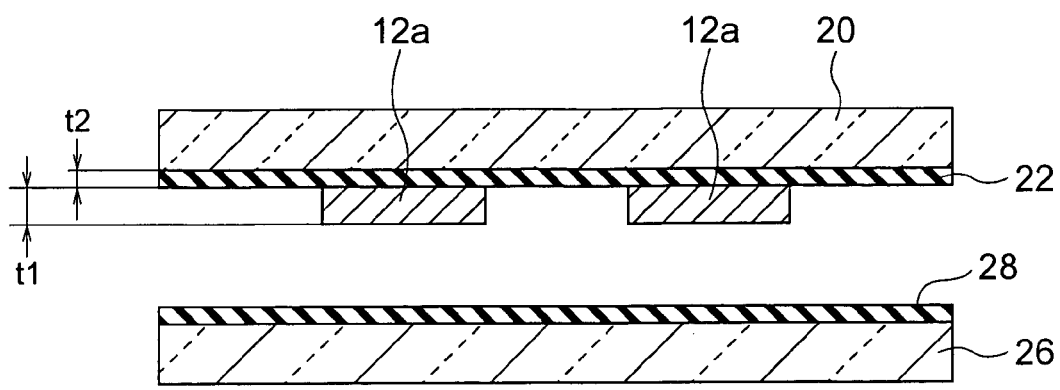
FIG. 2A to FIG. 2C and FIG. 3A to FIG. 3C are sectional views of a key portion of the-transfer method of an internal electrode layer film.

Next, as shown in FIG. 2A, a carrier sheet 20 as a first supporting sheet is prepared separately from the above carrier sheet 30, and a release layer 22 is formed thereon. Next, on a surface of the release layer, an internal electrode layer film 12a for composing an internal electrode layer 12 after firing is formed to be a predetermined pattern.

A thickness of the internal electrode layer film 12a to be formed is preferably 0.1 to 1 μm, and more preferably 0.1 to 0.5 μm or so. The internal electrode layer film 12a may be composed of a single layer or a plurality of layers of two or more having different compositions.

A method of forming the internal electrode layer film is not particularly limited and the thin film method and the printing method, etc. may be mentioned. Below, the case of forming by the thin film method and the case of forming by the printing method will be explained separately.

Thin Film Method

First, the case of forming the internal electrode layer film 12a by the thin film method will be explained.

As the thin film method, for example, the plating method, evaporation and sputtering, etc. may be mentioned. The case of forming an internal electrode layer alloy film as the internal electrode layer film 12a on the surface of the release layer 22 by the sputtering method as one of the thin film methods is performed as below.

As a sputtering target material, an alloy having a specific composition explained above is used. Namely, in the present embodiment, the above alloy is used as a target material for performing sputtering. A condition of the sputtering is a degree of an ultimate vacuum of preferably $10^{-2}$ Pa or less, and more preferably $10^{-3}$ Pa or less, Ar gas introduction pressure of preferably 0.1 to 2 Pa, and more preferably 0.3 to 0.8 Pa, an output of preferably 50 to 400 W, and more preferably 100 to 300 W, and a sputtering temperature of preferably 20 to 150° C., and more preferably 20 to 120° C.

In the present invention, since an alloy having a specific composition is used as a sputtering target, an obtained metal thin film is a Ni alloy thin film having a composition of the same ratio of that of the target.

In an alloy film as an internal electrode layer film 12a (after firing) formed by the thin film method, for example, in an X-ray diffraction chart of the case of using a Cu-kα ray as an X-ray source shown in FIG. 4, it is observed that a peak of the crystal plane (111) is close to 2θ=45°, a peak of the crystal plane (200) is close to 2θ=52° and a peak of the crystal plane (220) is close to 2θ=77°, respectively. When assuming that peak strength of the diffraction line on the crystal plane (111) is I(111), peak strength of the diffraction line on the crystal plane (200) is I(200), and peak strength of the diffraction line on the crystal plane (220) is I(220), it is preferable to include an alloy having a main plane satisfying (I(111)/I(200))≧3 and (I(111)/I(220))≧3, and more preferably (I(111)/I(200))≧5 and (I(111)/I(220))≧5. In the present invention, a metal having crystal orientation as such is preferably used as the alloy film. When (I(111)/I(200)) and (I(111)/I(220)) are small, it is liable to cause a disadvantage of spheroidizing and breaking, etc. Also, upper limits of (I(111)/I(200)) and (I(111)/I(220)) are 1:20 and 1:70, respectively.

An alloy film as the internal electrode layer film 12a formed by the thin film method includes an alloy having a crystalline size of preferably 10 to 100 nm, and more preferably 30 to 80 nm. When the crystalline size is too small, disadvantages of spheroidizing and breaking, etc. are caused, while when too large, a disadvantage that the film thickness becomes uneven, etc.

Printing Method

Next, the case of forming the internal electrode layer film 12a by the printing method will be explained.

As the printing method, for example, the screen printing, etc. may be mentioned. The base of forming an internal electrode layer conductive paste film as an internal electrode layer film 12a on the surface of the release layer 22 by the screen printing method as one of printing methods is performed as below.

First, another release layer (not shown) being different from the release layer 22 is formed on other carrier sheet (not shown) than the carrier sheet 30 shown in FIG. 2A and, on this release layer, an alloy film as an internal electrode layer film 12a for composing the internal electrode layer 12 after firing is formed by the thin film method, such as sputtering. At this time, as a sputtering target material, an alloy having a specific composition explained above is used. A sputtering condition and other various conditions may be the same as the above. After that, the formed alloy film is removed from the carrier sheet, crashed by a ball mill, etc., and classified to obtain alloy powder having an average particle diameter of 0.01 to 1 μm (preferably 0.05 to 0.4 μm). The alloy powder is kneaded with an organic vehicle to make a paste, so that the internal electrode layer conductive paste is obtained. As the organic vehicle, the same material as that in the case of the above dielectric paste can be used. The obtained conductive paste is formed to be a predetermined pattern on the surface of the release layer 22, so that the internal electrode layer conductive paste film as an internal electrode layer film 12a having a predetermined pattern is obtained.

Next, separately from the above carrier sheets 20 and 30, as shown in FIG. 2A, an adhesive layer transfer sheet, wherein an adhesive layer 28 is formed on a carrier sheet 26 as a third supporting sheet, is prepared. The carrier sheet 26 is configured by the same sheet as that in the carrier sheets 20 and 30.

Figure 2B:
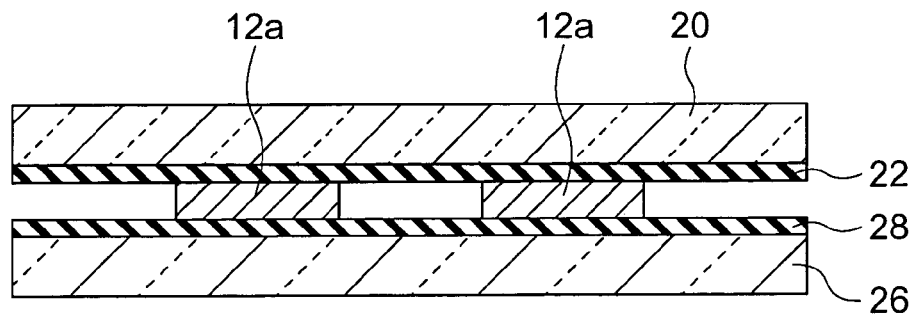
Figure 2C:
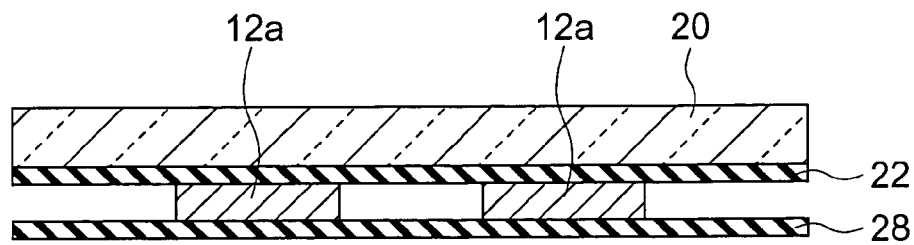

Next, to form the adhesive layer on the surface of the internal electrode layer film 12a shown in FIG. 2A, the transfer method is applied in the present embodiment. Namely, as shown in FIG. 2B, the adhesive layer 28 of the carrier sheet 26 is pressed against the surface of the internal electrode layer film 12*a*, heated and pressed, then, the carrier sheet 26 is removed, consequently, the adhesive layer 28 is transferred to the surface of the internal electrode layer film 12*a* as shown in FIG. 2C.

The heating temperature at the time is preferably 40 to 100° C., and the pressing force is preferably 0.2 to 15 MPa. Pressing may be performed by a press or a calendar roll, but is preferably performed by a pair of rolls.

Figure 3B:
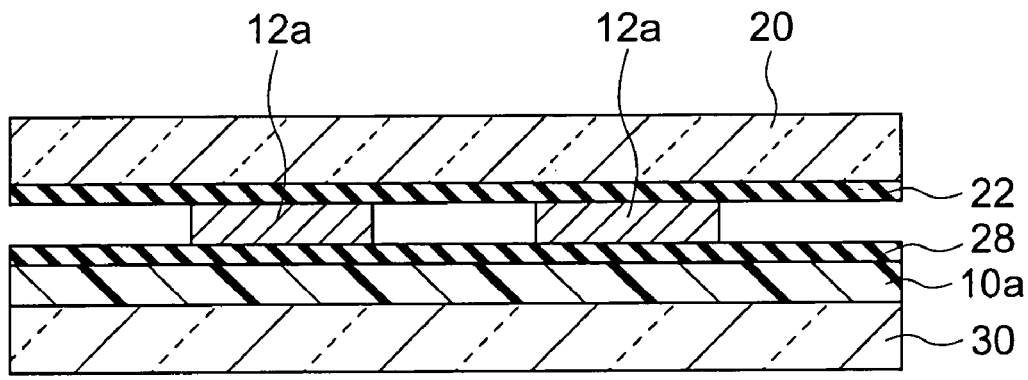
Figure 3C:
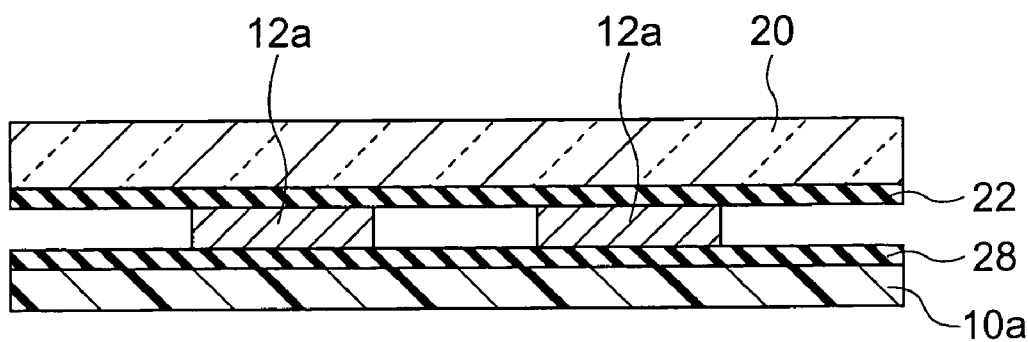

After that, the internal electrode layer film 12*a* is adhered to the surface of the green sheet 10*a* formed on the surface of the carrier sheet 30 shown in FIG. 3A. For that purpose, as shown in FIG. 3B, the internal electrode layer film 12*a* of the carrier sheet 20 is pressed against the surface of the green sheet 10*a* together with the carrier sheet 20 via the adhesive layer 28, heated and pressed, consequently, as shown in FIG. 3C, the internal electrode layer film 12*a* is transferred to the surface of the green sheet 10*a*. Note that since the carrier sheet 30 on the green sheet side is peeled off, when seeing from the green sheet 10*a* side, the green sheet 10*a* is transferred to the internal electrode layer film 12*a* via the adhesive layer 28.

Heating and pressing at the transferring may be pressing and heating by a press or by a calendar roll, but is preferably performed by a pair of rolls. The heating temperature and the pressing force are same as those in the case of transferring the adhesive layer 28.

By the steps shown in FIG. 2A to FIG. 3C as explained above, a single-layered internal electrode layer film 12*a* having a predetermined pattern is formed on a single green sheet 10*a*. By using this, a stacked body, wherein a large number of the internal electrode layer films 12*a* and green sheets 10*a* are stacked alternately, is obtained.

Then, after finally pressing the stacked body, the carrier sheet 20 is peeled off. The pressure at the time of the final pressing is preferably 10 to 200 MPa. Also, the heating temperature is preferably 40 to 100° C.

After that, the stacked body is cut into a predetermined size to form a green chip. Then, binder removal and firing are performed on the green chip.

The binder removal processing is preferably performed in the air or $N_2$ in a binder removal atmosphere when a Ni alloy (for example, Ni—Ru, Ni—Rh, Ni—Re or Ni—Pt) as a base metal is used as a component of the internal electrode layer as in the present invention. Other binder removal condition is a temperature raising rate of preferably 5 to 300° C./hour, and more preferably 10 to 50° C./hour, a holding temperature of preferably 200 to 400° C., and more preferably 250 to 350° C., and temperature holding time of preferably 0.5 to 20 hours, and more preferably 1 to 10 hours.

In the present invention, firing of the green chip is performed in an atmosphere having the oxygen partial pressure of preferably $10^{-10}$ to $10^{-2}$ Pa, and more preferably $10^{-10}$ to $10^{-5}$ Pa. When the oxygen partial pressure at firing is too low, the conductive material (alloy) of the internal electrode layer may be abnormally sintered to be broken, while when the oxygen partial pressure is too high, the internal electrode layer tends to be oxidized.

In the present invention, firing of the green chip is performed at a low temperature of 1300° C. or lower, more preferably 1000 to 1300° C., and particularly preferably 1150 to 1250° C. It is because when the firing temperature is too low, the green chip is not densified, while when the firing temperature is too high, internal electrodes break, a capacity-temperature characteristic deteriorates due to diffusion of the conductive material, and reducing of the dielectric is caused.

Other firing condition is a temperature raising rate of preferably 50 to 500° C./hour, and more preferably 200 to 300° C./hour, temperature holding time of preferably 0.5 to 8 hours, and more preferably 1 to 3 hours, and a cooling rate of preferably 50 to 500° C./hour, and more preferably 200 to 300° C./hour. Also, the firing temperature is preferably a reducing atmosphere and, for example, a mixed gas of $N_2$ and $H_2$ in a wet (moisturized) state is preferable as the atmosphere gas.

In the present invention, it is preferable to perform annealing on a capacitor chip body after firing. Annealing is processing for re-oxidizing the dielectric layers, and thereby, an accelerated lifetime of insulation resistance (IR) can be remarkably elongated and reliability improves.

In the present invention, annealing of the capacitor chip body after firing is performed preferably under a higher oxygen partial pressure than that in the reducing atmosphere at firing. Specifically, it is performed in an atmosphere with the oxygen partial pressure of preferably $10^{-2}$ to 100 Pa, and more preferably $10^{-2}$ to 10 Pa. When the oxygen partial pressure at annealing is too low, re-oxidization of the dielectric layer 2 is difficult, while when too high, the internal electrode layer 3 tends to be oxidized.

In the present invention, the holding temperature or the highest temperature at the time of annealing is preferably 1200° C. or lower, more preferably 900 to 1150° C., and particularly preferably 1000 to 1100° C. Also, in the present invention, holding time of the temperature is preferably 0.5 to 4 hours, and more preferably 1 to 3 hours. When the holding temperature or highest temperature at annealing is lower than the above ranges, there is a tendency that oxidization of the dielectric material is insufficient and the insulation resistance lifetime becomes short; while when higher than the above ranges, Ni of the internal electrode is oxidized, consequently, not only the capacity declines, but Ni reacts with the dielectric base material and the lifetime tends to become short. Note that the annealing may be composed only of the temperature raising step and the temperature lowering step. Namely, the temperature holding time may be zero. In this case, the holding temperature becomes synonymous with the highest temperature.

Other annealing condition is a cooling rate of preferably 50 to 500° C./hour, and more preferably 100 to 300° C./hour. Also, for example,, a wet $N_2$ gas, etc. is preferably used as an atmosphere gas in the annealing.

Note that, for example, a wetter, etc. may be used to wet the $N_2$ gas. In this case, the water temperature is preferably 0 to 75° C.

The binder removal processing, firing and annealing may be continuously performed or separately performed. When they are performed continuously, the atmosphere is changed without cooling after the binder removal processing, continuously, the temperature is raised to the holding temperature at firing to perform firing. Next, it is cooled and the annealing is preferably performed by changing the atmosphere when the temperature reaches to the holding temperature of the annealing. On the other hand, when performing them separately, for firing, it is preferable that after raising the temperature to the holding temperature of the binder removal processing in an atmosphere of a $N_2$ gas or a wet $N_2$ gas, the atmosphere is changed, and the temperature is furthermore raised. After cooling the temperature to the holding temperature of the annealing, it is preferable that the cooling continues by changing the atmosphere again to a $N_2$ gas or a wet $N_2$ gas. Also, in the annealing, after raising the temperature to the holding temperature in the $N_2$ gas atmosphere, the atmosphere may be changed, or the entire process of the thermal processing may be in a wet $N_2$ gas atmosphere.

The thus obtained sintered body (element body 4) is subjected to end surface polishing, for example, by barrel polishing and sand-blast, etc., then, a terminal electrode paste is burnt to form terminal electrodes 6 and 8. For example, a firing condition of the terminal electrode paste is preferably in a wet mixed gas of $N_2$ and $H_2$ at 600 to 800° C. for 10 minutes to 1 hour or so. In accordance with need, soldering, etc. is performed on the terminal electrodes 6 and 8 to form a pad layer. Note that the terminal electrode paste may be fabricated in the same way as in the electrode paste explained above.

A multilayer ceramic capacitor of the present invention produced as above is mounted on a print substrate, etc. by soldering, etc. and used for a variety of electronic equipments.

In the present embodiment, it is possible to provide a multilayer ceramic capacitor 2 wherein a decline of the capacitance is effectively suppressed. Since Ru, Rh, Re and Pt have a higher melting point than that of Ni, consequently, firing temperature of the conductive material rises to be close to the sintering temperature of the dielectric powder. As a result, firing defects of the dielectric powder as well as cracks and delamination of the internal electrode layers are not caused after sintering.

Also, in the present embodiment, since an organic metal compound is not used to form the internal electrode layer film 12a, there is a low possibility that cracks, etc. arise on the capacitor element 4.

Furthermore, in the present embodiment, the pre-firing internal electrode layer including a Ni based alloy having a specific composition is fired under a specific condition. Due to this, it is possible to raise a starting temperature of sintering the Ni based alloy for composing the internal electrode layer, suppress spheroidizing due to grain growth and form the internal electrode continuously, as a result, a decline of the capacitance can be suppressed.

Furthermore, in the present embodiment, annealing is performed under a specific annealing condition after the above firing. Due to the annealing processing, it is possible to re-oxidize the dielectric layer, prevent it from becoming semiconductive, and obtain high insulation resistance.

Also, in the present embodiment, the dry type internal electrode layer film 12a can be easily and accurately transferred to a surface of the green sheet 10a without breaking or deforming the green sheet 10a. Particularly, the adhesive layer 28 is formed by the transfer method on the surface of the electrode layer or the green sheet, and the internal electrode layer film 12a is adhered to the surface of the green sheet 10a via the adhesive layer 28. By forming the adhesive layer 28, high pressure and heat become unnecessary when transferring the internal electrode layer film 12a to the surface of the green sheet 10a, and it becomes possible to adhere with a low pressure at low temperature. Accordingly, even when the green sheet 10a is extremely thin, the green sheet 10a is not broken, the internal electrode layer films 12a and the green sheets 10a can be preferably stacked, and short-circuiting defects, etc. are not caused.

Second Embodiment

In the present embodiment, a multilayer ceramic capacitor is produced in the same way as in the first embodiment except for those described below.

In the present embodiment, an internal electrode layer film 12a shown in FIG. 2 and FIG. 3 is formed by a conductive paste including conductive particles 50 shown in FIG. 5.

The conductive particles 50 comprise a core portion, wherein nickel is the main component, and a cover layer 52 covering around the core portion 51. A shape of the core portion 51 is not particularly limited and may be a spherical shape, flake shape, projection form and/or an amorphous shape. In the present embodiment, the case of a spherical shape will be explained.

A particle diameter d0 of the core portion 51 is preferably in a range of 50 to 400 nm. A thickness t0 of the cover layer 52 is preferably in a range of 0.1 to 13 nm, and more preferably in a range of 0.1 to 7 nm.

The core portion 51 is composed of a metal including nickel as the main component or an alloy with other metal including nickel as the main component. A ratio of nickel in the core portion 51 is preferably 99 to 100 wt %, and more preferably 99.5 to 100 wt % with respect to 100 wt % of the core portion 51. Note that as a metal as a subcomponent capable of composing an alloy with nickel in the core portion 51, for example, Ta, Mo, Zr, Cu, Co, Fe, Nb and W, etc. may be mentioned.

The cover layer 52 is composed of a metal or an alloy including at least one kind of precious metal elements selected from ruthenium (Ru), rhodium (Rh), rhenium (Re) and platinum (Pt) as the main component. A ratio of these elements included as a main component is preferably 99 to 100 wt %, and more preferably 99.5 to 100 wt % assuming that the entire cover layer 52 is 100 wt %. As metal components (impurities), which may be included in the cover layer 52 other than the main component, Cu, Co, Fe, Ta, Nb, W, Zr, Au and Pd, etc. may be mentioned.

To produce the core portion 51 covered with the cover layer 52 as above, the thin film method, etc. may be applied. As the thin film method, a solution method, sputtering method, evaporation method, laser abrasion method, arc evaporation method and radio-frequency plasma CVD method, etc. may be mentioned.

In the solution method, for example, powder of the core portion 51 composed of Ni powder having an average particle diameter of 0.2 μm is immersed in a platinum chloride solution ($PtCl_4 \cdot 5H_2O$), heated and dried in a container provided with a recycling device, and thermal treatment (100 to 400° C.) in $N_2$ or in a vacuum is performed thereon. As a result, Ni powder (core portion 51) covered with the cover layer 52, for example, formed by a Pt film having a thickness of 4.2 nm can be precipitated.

Also, in the thin film method, for example, by holding Ni powder (core portion 51) having an average particle diameter of 0.2 μm on a tray of a vacuum chamber, Ni powder coated with Pt can be obtained by the sputtering method or the evaporation method. By configuring the tray to be capable of vibrating, it is possible to cover surfaces of the Ni powder.

The thus obtained conductive particles 50 are kneaded with an organic vehicle to make a paste, so that a conductive paste for forming an internal electrode layer film 12a can be obtained. The same organic vehicle as that in the case of the dielectric paste explained above can be used.

By forming the obtained conductive paste to be a predetermined pattern on the surface of the release layer 22, for example, by the screen printing, an internal electrode layer film 12a having a predetermined pattern can be obtained as shown in FIG. 4. A procedure after that is the same as that in the first embodiment explained above.

The same effects as those in the first embodiment explained above can be also obtained in the present embodiment, at the same time, effects below are also obtained. Namely, as explained above, Ru, Rh, Re and Pt are precious metals having a higher melting point than that of Ni. Also, the cover layer 52 including these metals or alloy as the main component has excellent wettability and adhesiveness with the ceramic green sheets 10a. Accordingly, by forming the internal electrode layer film 12a by using the conductive particles 50, wherein Ni is the main component, having the-cover layer 52, it is possible to suppress grain growth of Ni particles in the firing step, spheroidizing and breaking of electrodes are effectively prevented, and a decline of the capacitance is effectively suppressed. Also, delamination of the internal electrode layers 12 obtained after firing and the dielectric layers 10, etc. can be also prevented. Furthermore, firing defects of the dielectric particles are not caused.

Third Embodiment

In the present embodiment, a multilayer ceramic capacitor is produced in the same way as in the first embodiment except for those described below.

Figure 6:
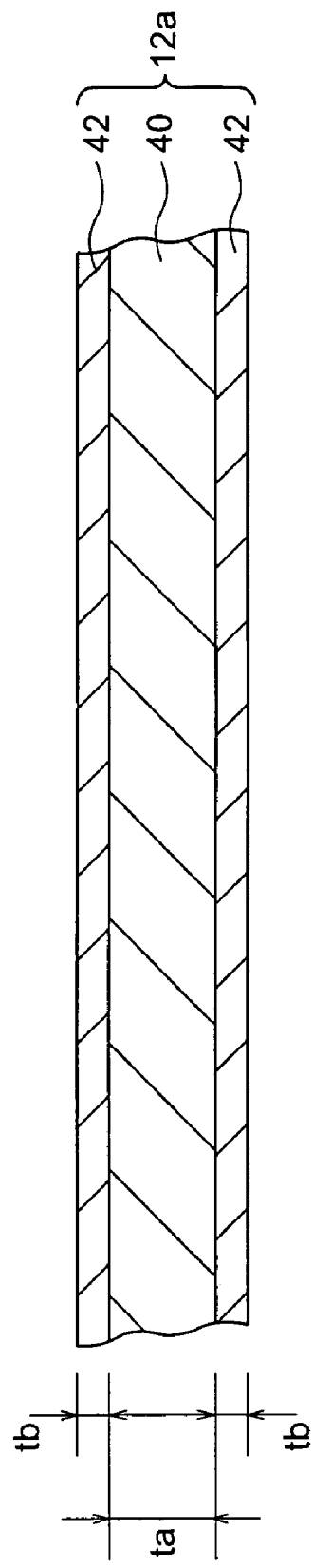
FIG. 6 is a sectional view of a key part showing a step of still another method of the present invention.

In the present embodiment, as shown in FIG. 6, each internal electrode layer film 12a to be the internal electrode layer 12 composed of a single-layered alloy film after firing is composed of a main conductive layer 40 and a pair of sub conductive layers 42 stacked on both sides thereof. Note that one of the sub conductive layers 42 may be omitted in the present embodiment.

The main conductive layer 40 is composed of a metal layer including nickel as the main component or an alloy layer with other metal including nickel as the main component. A ratio of nickel in the main conductive layer 40 is preferably 99 to 100 wt %, and more preferably 99.5 to 100 wt % when assuming that the entire main conductive layer 40 is 100 wt %. When the nickel ratio as the main component is too small, spheroidizing and breaking of electrodes due to grain growth of nickel particles at firing tend to be caused easily.

Note that as a metal as a subcomponent capable of composing an alloy with nickel in the main conductive layer 40, for example, Ta, Mo, Zr, Nb, W. Co, Fe and Cu, etc. may be mentioned.

The sub conductive layer 42 is composed of a metal layer or an alloy layer including at least one kind of precious metal element selected from ruthenium (Ru), rhodium (Rh), rhenium (Re) and platinum (Pt) as the main component. A ratio of these elements included as a main component is preferably 99 to 100 wt %, and more preferably 99.5 to 100 wt % when assuming that the entire sub conductive layer 42 is 100 wt %. When the ratio of the precious metal elements as the main component is too small, it is liable that the effect of suppressing grain growth of Ni particles in the main conductive layer 40 in a firing step declines. In the sub conductive layer, as components, which may be included other than the main component, Cu, Co, Fe, Ta, Nb, W, Zr, Au and Pd, etc. may be mentioned.

Between the main conductive layer 40 and the sub conductive layer 42, an alloy layer of the main components composing these layers may be formed. Note that the main conductive layer 40 and/or the sub conductive layer 42 may include a variety of trace components, such as P, S and C, by about 0.1 mol % or less.

Preferably, a thickness tb of the sub conductive layer 42 is more than 0 μm and 0.1 or less, and more preferably 0 μm (0 is not included) to 0.08 μm. Also, preferably, a thickness ta of the main conductive layer 40 is 0.1 μm or more and 1.0 μm or less. Furthermore, preferably, the thickness tb of the sub conductive layer 42 is preferably more than 0% and 30% or less, and more preferably more than 0% and 20% or less comparing with the thickness ta of the main conductive layer 40. Also, a total thickness of the internal electrode layer film 12a including the main conductive layer 40 and the pair of sub conductive layers 42 is preferably 1 μm or less, and preferably 0.1 μm or more and 0.5 μm or less. When the thickness of the sub conductive layer 42 is too thin, the effects of the present invention are small, while when the thickness of the sub conductive layer 42 is too thick comparing with the thickness of the main component layer 40, it is not preferable in terms of attaining low resistance because the thickness of the main conductive layer 40 becomes too thin to make the thickness of the internal electrode layer thinner in total.

Note that the pair of sub conductive layers 42 in the internal electrode layer film 12a preferably have the same film thickness, but the film thicknesses may be different. Also, the pair of sub conductive layers 42 are preferably composed of the same material in terms of simplification of the production procedure, but they may be composed of different materials.

A method of forming the internal electrode layer film 12a is not particularly limited, and the thin film method and the printing method, etc. may be mentioned. Below, the case of forming by the thin film method and the case of forming by the printing method will be explained separately.

Thin Film Method

First, the case of forming the internal electrode layer film 12a by the thin film method will be explained.

As the thin film method, for example, the plating method, evaporation and sputtering, etc. may be mentioned. The case of forming the internal electrode layer film 12a on the surface of the release layer 22, for example, by the sputtering method is performed as below.

First, as a sputtering target material, two kinds of materials for forming the above explained layers 42 and 40 are prepared. In the present embodiment, sputtering is performed by using the target for forming the layer 42 first, next, sputtering is performed by using the target for forming the layer 40, then, sputtering is performed by using the target for forming the layer 42 so as to form a film with three layers. It is preferable to perform these sputtering continuously in the same chamber but they may be performed in different chambers.

A sputtering condition is a degree of an ultimate vacuum of preferably $10^{-2}$ Pa or less, and more preferably $10^{-3}$ Pa or less, Ar gas instruction pressure of preferably 0.1 to 2 Pa, and more preferably 0.3 to 0.8 Pa, an output of preferably 50 to 400 W, and more preferably 100 to 300 W, and sputtering temperature of preferably 20 to 150° C., and more preferably 20 to 120° C.

Printing Method

Next, the case of forming the internal electrode layer film 12a by the printing method will be explained.

As the printing method, for example, the screen printing, etc. may be mentioned. The case of forming an internal electrode layer conductive paste film as the internal electrode layer film 12a on the surface of the release layer 22 shown in FIG. 2 by the screen printing method as one of printing methods is performed as below.

First, metal powder or alloy powder for forming the layers 40 and 42 are prepared. An average particle diameter of these powders is preferably 0.01 to 0.2 μm. The metal powder or alloy powder is kneaded with an organic vehicle to make a paste, so that a conductive paste for forming the layers 40 or 42 is obtained. In the organic vehicle, the same material as that in the case of the dielectric paste can be used. By forming the obtained conductive paste to be in a predetermined pattern on the surface of the release layer 22 shown in FIG. 2 successively, an internal electrode layer film 12a having the three-layered structure having a predetermined pattern is obtained.

Note that, the sub conductive layer 42 may be formed by the thin film method and the main conductive layer 40 may be formed by the printing method in the present embodiment. Also, when forming the sub conductive layer 42 by the printing method, the main conductive layer 40 may be formed by using a paste including the conductive particles 50 shown in FIG. 5.

After that, a multilayer ceramic capacitor is produced in the same way as in the first embodiment explained above.

The same effects as those in the first embodiment are obtained in the present embodiment. Particularly in the present embodiment, since the sub conductive layer 42 is formed by the above explained precious metals or an alloy including the precious metals and the main conductive layer 40 is configured by the same nickel metal layer as that in the conventional cases, the sub conductive layer 42 is capable of suppressing grain growth of Ni particles in a firing step, effectively preventing spheroidizing and breaking of electrodes, and effectively preventing a decline of the capacitance. Also, delamination, etc. of the internal electrode layer 12 and the dielectric layer 10 can be also prevented. Furthermore, a firing defect of the dielectric powder is not caused.

Embodiments of the present invention were explained above, but the present invention is not limited to the embodiments and may be variously modified within the scope of the present invention.

For example, the present invention is not limited to a multilayer ceramic capacitor and may be applied to other electronic devices.

Below, the present invention will be explained based on furthermore detailed examples, but the present invention is not limited to the examples.

EXAMPLE 1

Production of Respective Pastes

First, $BaTiO_3$ powder (BT-02 made by Sakai Chemical Industry Co., Ltd.) and powder selected from $MgCO_3$, $MnCO_3$, $(Ba_{0.6}Ca_{0.4})SiO_3$ and rare earths ($Gd_2O_3$, $Tb_4O_7$, $Dy_2O_3$, $Ho_2O_3$, $Er_2O_3$, $Tm_2O_3$, $Yb_2O_3$, $Lu_2O_3$ and $Y_2O_3$) were wet mixed by a ball mill for 16 hours and dried to obtain a dielectric material. An average particle diameter of the material powder was 0.1 to 1 μm. The $(Ba_{0.6}Ca_{0.4})SiO_3$ was produced by performing wet mixing on $BaCO_3$, $CaCO_3$ and $SiO_2$ by a ball mill for 16 hours, firing the same at 1150° C. in the air after drying, and performing wet grinding on the result by a ball mill for 100 hours.

An organic vehicle was added to the dielectric material and mixed by a ball mill to make the obtained dielectric material a paste, so that a dielectric green sheet paste was obtained. The organic vehicle has a compounding ratio of 6 parts by weight of polyvinyl butyral as a binder, 3 parts by weight of bis(2 ethylhexyl) phthalate (DOP) as a plasticizer, 55 parts by weight of ethyl acetate, 10 parts by weight of toluene and 0.5 part by weight of paraffin with respect to 100 parts by weight of the dielectric material.

Next, the dielectric green sheet paste was diluted by two times in the weight ratio by ethanol/toluene (55/10) to obtain a release layer paste.

Next, the same dielectric green sheet paste except that dielectric particles and a release agent are not included was diluted by 4 times in the weight ratio by toluene to obtain an adhesive layer paste.

Formation of Green Sheet

First, by using the above dielectric green sheet paste, a green sheet having a thickness of 1.0 μm was formed on a PET film (second supporting sheet) by using a wire bar coater.

Formation of Internal Electrode Layer Film

The above release layer paste was applied on another PET film (first supporting sheet) by a wire bar coater and dried to form a release layer having a thickness of 0.3 μm.

Next, a mask formed with a predetermined pattern for an internal electrode is set on a surface of the release layer, and an internal electrode layer film (Ni alloy thin film) of a predetermined thickness (refer to respective tables) was formed by the sputtering method. The sputtering condition was a degree of an ultimate vacuum of $10^{-3}$ Pa or less, Ar gas introduction pressure of 0.5 Pa, an output of 200 W and at the room temperature (20° C.). Also, Ni and additive elements (Ru, Rh, Re and Pt) were compounded to be predetermined compositions as shown in the respective tables, and a sputtering target obtained by being cut into a shape having a diameter of about 4 inches and a thickness of 3 mm was used.

Evaluation of Internal Electrode Layer Film (After Firing)

It was confirmed by X-ray diffraction that the additive elements are dispersed in a solid state. Also, the crystalline size (unit: nm) was obtained by a half-value width. X-ray diffraction charts of sputtering thin films of an example sample in Table 3 (Ni=94 mol %) and a reference example sample in Table 3 (Ni=100 mol %) to be explained later on are shown in FIG. 4, respectively. In the X-ray diffraction chart shown in FIG. 4, it is confirmed that a peak of the crystal plane (111) of Ni alloy particles is close to 2θ=45°, and a peak of the crystal plane (200) is close to 2θ=52°. Note that a peak of the crystal plane (220) is close to 2θ=77°, but the illustration is omitted in FIG. 4. By considering height of the X-ray diffraction peaks as X-ray diffraction strength and by deriving the strength ratio of the crystal plane (200) and the crystal plane (200) with respect to the crystal plane (111) from the above relationship, crystal orientation of the metal thin films were evaluated. Specifically, an I(111)/I(200) value and an I(111)/I(220) value of the sputtering thin films in the X-ray diffraction chart shown in FIG. 4 are shown in the respective tables. The X-ray diffraction chart of the sputtering thin films was measured by a powder X-ray (Cu—Kα ray) diffraction device under the condition below. The X-ray generating condition was an output of 45 kV-40 mA and a scanning width of 0.2°/minute. The X-ray detecting condition was a parallel slit of 1.0°, a divergent slit of 1.0° and a light receiving slit of 0.30 mm.

Thicknesses (film thickness) of the sputtering thin films were measured by observing by a SEM.

Formation of Adhesive Layer

The above adhesive layer paste was applied to another PET film (third supporting sheet), a surface of which is subjected to release processing by a silicon based resin, by a wire bar coater and dried to form an adhesive layer 28 having a thickness of 0.2 μm.

Formation of Final Stacked Body (Pre-Firing Element Body)

First, the adhesive layer 28 was transferred to a surface of the internal electrode layer film 12a by the method shown in FIG. 2. A pair of rolls were used at the time of transferring, a pressure force thereof was 0.1 MPa and the temperature was 80° C.

Next, as shown in the method shown in FIG. 3, the internal electrode layer film 12a was adhered (transferred) to a surface of the green sheet 10a via the adhesive layer 28 by the method shown in FIG. 3. A pair of rolls was used at the time of transferring, a pressure force thereof was 0.1 MPa and the temperature was 80° C.

Next, the internal electrode layer films 12a and the green sheets 10a were stacked successively and a final stacked body, wherein internal electrode layer films 12a were stacked by the number of 21, was finally obtained. The stacking condition was a pressure force thereof of 50 MPa and the temperature of 120° C.

Production of Sintered Body

Next, the final stacked body was cut to be a predetermined size, binder removal processing, firing and annealing (thermal treatment) were performed, so that a chip shaped sintered body was produced.

The binder removal was performed as below.
Temperature raising rate: 5 to 300° C./hour, particularly 10 to 50° C./hour
Holding temperature: 200 to 400° C., particularly 250 to 350° C.
Holding time: 0.5 to 20 hours, particularly 1 to 10 hours
Atmosphere gas: wet mixed gas of $N_2$ and $H_2$ The firing was performed as below.
Temperature raising rate: 5 to 500° C./hour, particularly 200 to 300° C./hour
Holding temperature: 1000 to 1300° C., particularly 1150 to 1250° C.
Holding time: 0.5 to 8 hours, particularly 1 to 3 hours
Cooling rate: 50 to 500° C./hour, particularly 200 to 300° C./hour
Atmosphere gas: wet mixed gas of $N_2$ and $H_2$
Partial oxygen pressure: refer to respective tables The annealing (re-oxidization) was performed as below.
Temperature raising rate: 200 to 300° C./hour
Holding temperature: refer to the respective tables
Holding time: 2 hours
Cooling rate: 300° C./hour
Atmosphere has: wet $N_2$ gas
Partial oxygen pressure: refer to respective tables Note that a wetter was used for wetting the atmosphere gas, and the water temperature was 0 to 75° C.

Next, end surfaces of the chip shaped sintered body were polished by sand blast, then, an external electrode paste was transferred to the end surfaces, and external electrodes were formed by firing at 800° C. for 10 minutes in a wet $N_2+H_2$ atmosphere gas, so that samples of a multilayer ceramic capacitor-having the configuration shown in FIG. 1 were obtained.

A size of the thus obtained samples was 3.2 mm×1.6 mm×0.6 mm, the number of dielectric layers sandwiched between internal electrode layers was 21, the thickness was 1 μm, and a thickness of an internal electrode layer was 0.5 μm. Evaluation of electric characteristics (a capacitance C, resistivity and dielectric loss tanσ) was made on the respective samples. The results are shown in the respective tables. The electric characteristics (a capacitance C, resistivity and dielectric loss tanσ) were evaluated as below.

The capacitance C (unit: μF) was measured on the samples by using a digital LCR meter (4274A made by YHP) at a reference temperature of 25° C. under a condition of a frequency of 1 kHz and an input signal level (measurement voltage) of 1 Vrms. A capacitance C of preferably 0.9 μF or more was determined good.

The resistivity (unit: Ω·m) was measured on a sputter film (before firing) formed on a glass substrate by using a resistivity measuring device (Σ-5 made by NPS Inc.) at 25° C. by the direct-current 4-points probe method (a current of 1 mA for two seconds). A resistivity of preferably $70 \times 10^{-8}$ Ω·m or less was determined preferable.

The dielectric loss tan σ was measured at 25° C. by a digital LCR meter (4274A made by YHP) under a condition of a frequency of 1 kHz and an input signal level (measurement voltage) of 1 Vrms. The dielectric loss tan σ of preferably less than 0.1 was determined preferable.

Note that these characteristic values were obtained from average values of values measured by using samples by the number n=10. In tables, "o" in evaluation reference sections indicates those exhibited preferable results in all of the above characteristics, and "x" indicates those which could not obtain any one of preferable results in them.

TABLE 1

| | Ni mol % | Ru mol % | Crystalline Size nm | X-ray Peak Strength Ratio | | Capacitance μF | Resistivity × $10^{-8}$ Ω·m | tan σ | Evaluation |
| --- | --- | --- | --- | --- | --- | --- | --- | --- | --- |
| | | | | I(111)/I(200) | I(111)/I(220) | | | | |
| Comparative Example Sample | 100 | 0 | 68 | 3.3 | 1.9 | 0.88 | 6.8 | 0.01 | x |
| Example Sample | 99.95 | 0.05 | 65 | 3.2 | 4.0 | 0.90 | 7 | 0.01 | o |
| Example Sample | 99.9 | 0.1 | 65 | 3.2 | 4.0 | 1.00 | 7.5 | 0.01 | o |
| Example Sample | 99.5 | 0.5 | 66 | 3.4 | 4.5 | 1.01 | 7.8 | 0.01 | o |
| Example Sample | 99 | 1 | 67 | 3.4 | 4.6 | 1.05 | 8.2 | 0.01 | o |
| Example Sample | 98 | 2 | 63 | 3.3 | 4.7 | 1.07 | 8.5 | 0.01 | o |
| Example Sample | 97 | 3 | 65 | 3.2 | 7.7 | 1.11 | 8.9 | 0.01 | o |
| Example Sample | 95 | 5 | 65 | 3.1 | 5.0 | 1.17 | 9 | 0.02 | o |
| Example Sample | 89 | 11 | 63 | 3.1 | 6.0 | 1.18 | 22 | 0.03 | o |
| Example Sample | 80 | 20 | 64 | 3.1 | 6.0 | 1.18 | 26 | 0.08 | o |

TABLE 1-continued

| | Ni mol % | Ru mol % | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|---|
| Comparative Example Sample | 70 | 30 | 67 | 3.0 | 8.0 | 1.16 | 75 | 0.2 | x |

Thickness of alloy film = 0.3 μm
Firing temperature = 1200° C.
Oxygen partial pressure at firing = $10^{-7}$ Pa
Annealing temperature = 1050° C.
Annealing time = 2 hours
Oxygen partial pressure at annealing = $10^{-1}$ Pa

TABLE 2

| | Ni mol % | Rh mol % | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|---|
| Comparative Example Sample | 100 | 0 | 68 | 3.3 | 1.9 | 0.88 | 6.8 | 0.01 | x |
| Example Sample | 99.95 | 0.05 | 67 | 3.3 | 3.0 | 0.93 | 7 | 0.01 | ○ |
| Example Sample | 99.9 | 0.1 | 68 | 3.3 | 3.0 | 1 | 7.3 | 0.01 | ○ |
| Example Sample | 99.5 | 0.5 | 65 | 3.5 | 3.5 | 1.02 | 7.4 | 0.01 | ○ |
| Example Sample | 99 | 1 | 65 | 3.5 | 3.5 | 1.07 | 7.6 | 0.01 | ○ |
| Example Sample | 98 | 2 | 64 | 3.5 | 3.7 | 1.09 | 7.6 | 0.01 | ○ |
| Example Sample | 97 | 3 | 63 | 3.8 | 3.9 | 1.12 | 7.6 | 0.01 | ○ |
| Example Sample | 94 | 6 | 60 | 4.2 | 4.0 | 1.15 | 7.8 | 0.01 | ○ |
| Example Sample | 92 | 8 | 58 | 4.9 | 4.4 | 1.15 | 14 | 0.01 | ○ |
| Example Sample | 80 | 20 | 59 | 5.2 | 4.4 | 1.16 | 23 | 0.07 | ○ |
| Comparative Example Sample | 70 | 30 | 59 | 5 | 5.1 | 1.16 | 79 | 0.19 | x |

Thickness of alloy film = 0.3 μm
Firing temperature = 1200° C.
Oxygen partial pressure at firing = $10^{-7}$ Pa
Annealing temperature = 1050° C.
Annealing time = 2 hours
Oxygen partial pressure at annealing = $10^{-1}$ Pa

TABLE 3

| | Ni mol % | Re mol % | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|---|
| Comparative Example Sample | 100 | 0 | 68 | 3.3 | 1.9 | 0.88 | 6.8 | 0.01 | x |
| Example Sample | 99.95 | 0.05 | 67 | 3.4 | 3.5 | 0.92 | 7 | 0.01 | ○ |
| Example Sample | 99.9 | 0.1 | 65 | 3.6 | 4.0 | 1.03 | 7.5 | 0.01 | ○ |
| Example Sample | 99.5 | 0.5 | 64 | 3.7 | 4.2 | 1.05 | 7.7 | 0.01 | ○ |
| Example Sample | 99 | 1 | 68 | 4.0 | 5.5 | 1.06 | 8 | 0.01 | ○ |
| Example Sample | 98 | 2 | 66 | 5.2 | 6.5 | 1.09 | 8.9 | 0.01 | ○ |
| Example Sample | 97 | 3 | 66 | 5.7 | 7.1 | 1.13 | 11.5 | 0.02 | ○ |
| Example Sample | 94 | 6 | 67 | 6.1 | 7.9 | 1.16 | 13 | 0.02 | ○ |
| Example Sample | 89 | 11 | 64 | 14 | 66 | 1.16 | 25 | 0.02 | ○ |
| Example Sample | 80 | 20 | 62 | 15 | 64 | 1.17 | 29 | 0.07 | ○ |
| Comparative Example Sample | 70 | 30 | 60 | 14 | 70 | 1.16 | 85 | 0.19 | x |

Thickness of alloy film = 0.3 μm
Firing temperature = 1200° C.
Oxygen partial pressure at firing = $10^{-7}$ Pa
Annealing temperature = 1050° C.
Annealing time = 2 hours
Oxygen partial pressure at annealing = $10^{-1}$ Pa

TABLE 4

| | Ni mol % | Pt mol % | Crystalline Size nm | X-ray Peak Strength Ratio I(111)/I(200) | X-ray Peak Strength Ratio I(111)/I(220) | Capacitance μF | Resistivity × $10^{-8}$ Ω · m | tan σ | Evaluation |
|---|---|---|---|---|---|---|---|---|---|
| Comparative Example Sample | 100 | 0 | 68 | 3.3 | 1.9 | 0.88 | 6.8 | 0.01 | x |
| Example Sample | 99.95 | 0.05 | 63 | 3.3 | 4.3 | 1 | 7.1 | 0.01 | ○ |
| Example Sample | 99.9 | 0.1 | 65 | 3.3 | 4.3 | 1.05 | 7.5 | 0.01 | ○ |
| Example Sample | 99.5 | 0.5 | 67 | 3.4 | 4.6 | 1.06 | 7.5 | 0.01 | ○ |
| Example Sample | 99 | 1 | 68 | 3.4 | 4.7 | 1.07 | 7.5 | 0.01 | ○ |
| Example Sample | 98 | 2 | 67 | 3.6 | 4.7 | 1.1 | 8 | 0.01 | ○ |
| Example Sample | 97 | 3 | 66 | 3.6 | 4.7 | 1.11 | 8.5 | 0.02 | ○ |
| Example Sample | 94 | 6 | 64 | 3.7 | 4.7 | 1.15 | 9.5 | 0.02 | ○ |
| Example Sample | 89 | 11 | 64 | 3.8 | 5.2 | 1.16 | 13.6 | 0.03 | ○ |
| Example Sample | 80 | 20 | 65 | 3.9 | 5.5 | 1.16 | 20.5 | 0.05 | ○ |
| Comparative Example Sample | 70 | 30 | 69 | 4.5 | 7 | 1.14 | 71 | 0.18 | x |

Thickness of alloy film = 0.3 μm
Firing temperature = 1200° C.
Oxygen partial pressure at firing = $10^{-7}$ Pa
Annealing temperature = 1050° C.
Annealing time = 2 hours
Oxygen partial pressure at annealing = $10^{-1}$ Pa

TABLE 5

| | Alloy Film Thickness μm | Crystalline Size nm | X-ray Peak Strength Ratio I(111)/I(200) | X-ray Peak Strength Ratio I(111)/I(220) | Capacitance μF | Resistivity × $10^{-8}$ Ω · m | tan σ | Evaluation |
|---|---|---|---|---|---|---|---|---|
| Reference Sample | 0.05 | 63 | 3.2 | 5 | 0.5 | 7 | 0.01 | x |
| Example Sample | 0.1 | 62 | 3.1 | 5.1 | 0.9 | 7 | 0.02 | ○ |
| Example Sample | 0.3 | 65 | 3.1 | 5 | 1.17 | 7 | 0.02 | ○ |
| Example Sample | 0.6 | 65 | 3.3 | 5.2 | 1.15 | 7 | 0.02 | ○ |
| Example Sample | 0.8 | 65 | 3.2 | 5.1 | 1.15 | 7 | 0.02 | ○ |
| Example Sample | 1 | 65 | 3.1 | 5.1 | 1.15 | 7 | 0.02 | ○ |

Ni(mol %):Ru(mol %) = 95:5
Firing temperature = 1200° C.
Oxygen partial pressure at firing = $10^{-7}$ Pa
Annealing temperature = 1050° C.
Annealing time = 2 hours
Oxygen partial pressure at annealing = $10^{-1}$ Pa

TABLE 6

| | Firing Temperature ° C. | Crystalline Size nm | X-ray Peak Strength Ratio I(111)/I(200) | X-ray Peak Strength Ratio I(111)/I(220) | Capacitance μF | Resistivity × $10^{-8}$ Ω · m | tan σ | Evaluation |
|---|---|---|---|---|---|---|---|---|
| Reference Sample | 950 | 40 | 3.5 | 5.7 | 0.6 | 7 | 0.07 | x |
| Example Sample | 1000 | 48 | 3.2 | 5.2 | 1 | 7 | 0.06 | ○ |
| Example Sample | 1050 | 65 | 3.1 | 5 | 1.17 | 7 | 0.02 | ○ |
| Example Sample | 1200 | 53 | 3.1 | 5 | 1.17 | 7 | 0.02 | ○ |
| Example Sample | 1300 | 73 | 3.1 | 5 | 0.98 | 7 | 0.02 | ○ |
| Reference Sample | 1350 | 97 | 2 | 4.3 | 0.68 | 7 | 0.02 | x |

Ni(mol %):Ru(mol %) = 95:5
Thickness of alloy film = 0.3 μm
Oxygen partial pressure at firing = $10^{-7}$ Pa
Annealing temperature = 1050° C.
Annealing time = 2 hours
Oxygen partial pressure at annealing = $10^{-1}$ Pa

TABLE 7

|  | Oxygen Partial Pressure at Firing Pa | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|
| Reference Sample | $10^{-11}$ | 68 | 3.5 | 5.8 | 0.88 | 7 | 0.05 | x |
| Example Sample | $10^{-10}$ | 65 | 3.2 | 5.2 | 1 | 7 | 0.05 | ○ |
| Example Sample | $10^{-12}$ | 66 | 3.2 | 5.2 | 1.11 | 7 | 0.03 | ○ |
| Example Sample | $10^{-7}$ | 65 | 3.1 | 5 | 1.17 | 7 | 0.02 | ○ |
| Example Sample | $10^{-2}$ | 60 | 3 | 5 | 1.05 | 7 | 0.02 | ○ |
| Reference Sample | $10^{-1}$ | 48 | 2.2 | 4.2 | 0.48 | 7 | 0.02 | x |

Ni(mol %):Ru(mol %) = 95:5
Thickness of alloy film = 0.3 μm
Firing temperature = 1200° C.
Annealing temperature = 1050° C.
Annealing time = 2 hours
Oxygen partial pressure at annealing = $10^{-1}$ Pa

TABLE 8

|  | Annealing Temperature ° C. | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|
| Example Sample | 800 | 64 | 3.1 | 5 | 1.15 | 7 | 0.35 | x |
| Example Sample | 900 | 65 | 3.1 | 5 | 1.15 | 7 | 0.09 | ○ |
| Example Sample | 1050 | 65 | 3.1 | 5 | 1.17 | 7 | 0.02 | ○ |

Ni(mol %):Ru(mol %) = 95:5
Thickness of alloy film = 0.3 μm
Firing temperature = 1200° C.
Oxygen partial pressure at firing = $10^{-7}$ Pa
Annealing time = 2 hours
Oxygen partial pressure at annealing = $10^{-1}$ Pa

TABLE 9

|  | Oxygen Partial Pressure at Annealing Pa | Crystalline Size nm | X-ray Peak Strength Ratio I(111)/I(200) | I(111)/I(220) | Capacitance μF | Resistivity × $10^{-8}$ Ω · m | tan σ | Evaluation |
|---|---|---|---|---|---|---|---|---|
| Reference Sample | $10^{-3}$ | 62 | 3 | 5.1 | 1.2 | 7 | 0.21 | x |
| Example Sample | $10^{-2}$ | 63 | 3 | 5.1 | 1.09 | 7 | 0.08 | ○ |
| Example Sample | $10^{-1}$ | 65 | 3.1 | 5 | 1.17 | 7 | 0.02 | ○ |
| Example Sample | $10^{0}$ | 63 | 3.1 | 5 | 1.1 | 7 | 0.02 | ○ |
| Example Sample | $10^{1}$ | 62 | 3.1 | 5 | 1 | 7 | 0.02 | ○ |
| Example Sample | $10^{2}$ | 60 | 3.1 | 5 | 0.98 | 7 | 0.02 | ○ |
| Reference Sample | $10^{3}$ | 48 | 2 | 4.3 | 0.49 | 7 | 0.02 | x |

Ni(mol %):Ru(mol %) = 95:5
Thickness of alloy film = 0.3 μm
Firing temperature = 1200° C.
Oxygen partial pressure at firing = $10^{-7}$ Pa
Annealing temperature = 1050° C.
Annealing time = 2 hours As shown in Tables 1 to 4, as to contents of Ni and Ru, Rh, Re or Pt (unit: mol %), when Ni: (Ru, Rh, Re or Pt)=100:0, a decline of the capacitance could not be suppressed. When Ni: (Ru, Rh, Re or Pt)=70:30, a decline of the capacitance could be suppressed, but the resistivity increased and tan σ increased. On the other hand, when Ni: (Ru, Rh, Re or Pt)=80 to 100 (note that 100 is excluded): 0 to 20 (note that 0 is excluded), it was confirmed that a decline of the capacitance could be suppressed without causing increases of the resistivity and tan σ. Above all, it was confirmed that Ni: (Ru, Rh, Re or Pt)=(87 to 99.9):(0.1 to 13) was preferable in terms of improving a capacitance and resistivity and reducing the dielectric loss tan σ.

As shown in Table 5, as to a thickness of the alloy thin film, when the alloy film thickness=0.05 μm, it was liable that spheroidizing was caused in the internal electrode layers and a decline of the capacitance could not be suppressed. On the other hand, when the alloy film thickness=0.1 to 1 μm, it was confirmed that spheroidizing was not caused in the internal electrode layers and a decline of the capacitance could be suppressed.

As shown in Table 6, as to the firing temperature at firing, when the firing temperature=950° C., the dielectric layers were not sufficiently sintered and a decline of the capacitance could not be suppressed. When the firing temperature=1350° C., the spheroidizing were caused in the internal electrode layers and a decline of the capacitance could not be suppressed. On the other hand, when the firing temperature=1000 to 1300° C., it was confirmed that a decline of the capacitance could be suppressed without causing insufficient sintering, spheroidizing in the internal electrode layers and diffusion of the internal electrode layers into the dielectric layers.

As shown in Table 7, as to the oxygen partial pressure at firing, when the oxygen partial pressure=$10^{-11}$ Pa, spheroidizing as well as breaking arise in the internal electrode layers and a decline of the capacitance could not be suppressed. When the oxygen partial pressure=$10^{-1}$ Pa, the spheroidizing as well as oxidization were caused in the internal electrode layers, a resistance value of the internal electrodes became high and a decline of the capacitance could not be suppressed. On the other hand, when the oxygen partial pressure=$10^{10}$ to $10^{-2}$ Pa, it was confirmed that a decline of the capacitance could be suppressed without causing spheroidizing or breaking in the internal electrode layers and diffusion of the internal electrode layers into the dielectric layers.

As shown in Table 8, as to the holding temperature at annealing, when the holding temperature=800° C., insufficient annealing was caused, so that the tanσ tended to become large. On the other hand, when the holding temperature=900 and 1050° C., it was confirmed that insufficient annealing was not caused, the tanσ was suppressed low, and a decline of the capacitance could be suppressed.

As shown in Table 9, as to the oxygen partial pressure at annealing, when the oxygen partial pressure=$10^{-3}$ Pa, the dielectric layers became semiconductive and the tanσ tended to become large. When the oxygen partial pressure=$10^3$ Pa, it was liable that the internal electrode layers were oxidized and a decline of the capacitance proceeded. On the other hand, when the oxygen partial pressure=$10^{-2}$ to 100 Pa, it was confirmed that a decline of the capacitance can be suppressed without making the dielectric layers semiconductive or oxidizing the internal electrode layers while suppressing the tanσ low.

Example 2

Production of Respective Pastes

Respective pastes (a dielectric green sheet paste, a release layer paste and an adhesive layer paste) were produced in the same way as in the example 1.

In addition to this, an internal electrode layer conductive paste was produced as below in the present example. First, the release layer paste used in the example 1 was applied to a PET film by the wire bar coater and dried to form a release layer having a thickness of 0.3 μm. Next, an internal electrode layer film (Ni alloy thin film) of a predetermined thickness (refer to the tables explained above) was formed allover the surface of the release layer without a mask by the sputtering method. The sputtering condition and the target were the same as those in the example 1. When evaluating the internal electrode layer film (sputtering thin film), the same result as that in the example 1 was obtained. Next, the formed Ni alloy thin film was removed from the PET film, roughly ground by a mortar and finely ground by a ball mill. After that, the results were recovered and classified to a particle diameter of 0.01 to 1 μm (preferably 0.05 to 0.4 μm) and alloy powder was obtained. Next, an organic vehicle was added to the obtained alloy powder, mixed by a ball mill to obtain an internal electrode layer conductive paste. The organic vehicle had the compounding ratio of 4.5 parts by weight of ethyl cellulose as a binder and 75 parts by weight of terpineol with respect to 100 parts by weight of the alloy powder.

Formation of Green Sheet

It was the same as in the example 1.

Formation of Internal Electrode Layer Paste

The above release layer paste was applied to another PET film (first supporting sheet) by a wire bar coater and dried to form a release layer having a thickness of 0.3 μm.

Next, the obtained conductive paste was formed to be a predetermined pattern on the surface of the release layer by the screen printing, and an internal electrode layer conductive paste film as an internal electrode layer film of a predetermined pattern was formed.

Below, samples of the multilayer ceramic capacitor were formed in the same way as in the example 1 and the same evaluation was made. As a result, the same results were obtained.

Example 3

Other than using the conductive particles 50 shown in FIG. 5 instead of the alloy powder, samples of the multilayer ceramic capacitor were formed in the same way as in the example 2 and the same evaluation were made. As a result, the same results were obtained.

Note that the conductive particles 50 were produced as below. First, 100% Ni powder having a spherical shape were prepared as the core portions 51. An average particle diameter of the powder was 0.2 μm. The Ni powder was immersed in a platinum chloride solution ($PtCl_4.5H_2O$), stirred and heated in a container, and thermal treatment (100 to 400° C.) in $N_2$ or in a vacuum was performed thereon. As a result, A Pt film was precipitated to the Ni powder, and conductive particles 50 composed of the Ni powder (core portions 51) covered with a Pt film (cover layer 52) could be produced. As a result of observing the conductive particles by a transmission electron microscope and crystal structure analysis, the surface portion of the Ni particles were confirmed to be covered with 4.2 nm of Pt.

As a result of observing by the TEM-EDS, the internal electrode layers of an element body obtained after firing were confirmed to be alloy layers of Ni and Pt.

Example 4

Other than using a multilayer thin film as shown in FIG. 6 as an internal electrode layer film instead of a single-layered Ni alloy thin film, samples of the multilayer ceramic capacitor were formed in the same way as in the example 1 and the same evaluation was made. As a result, the same results were obtained.

Note that the first layer 42 was a Pt film (almost 100% Pt) having a film thickness of 0.02 μm, the second layer 40 is a Ni film (almost 100% Ni) of 0.3 μm, and the third layer 42 was a Pt film (almost 100% Pt) having a film thickness of 0.02 μm.

A sputtering condition was a degree of an ultimate vacuum of $10^{-3}$ Pa or less, Ar gas instruction pressure of 0.5 Pa, an output of 200 W in the room temperature (20° C.).

As a result of observing by the TEM-EDS, the internal electrode layers of an element body obtained after firing were confirmed to be alloy layers of Ni and Pt.

REFERENCE EXAMPLE 1

Other than mixing Ni powder and an organic metal compound containing Pt with an organic vehicle instead of the alloy powder to produce an internal electrode layer conductive paste, samples of the multilayer ceramic capacitor were formed in the same way as in the example 2 and the number of occurrence of cracks were examined. The results are shown in Table 10. Note that naphthenic acid was used as the organic metal compound.

Note that as to the number of occurrence of cracks, 100 samples having the same composition were prepared and the number of cracks arose on the 100 samples was examined. Observation of the cracks was made by observing the outer appearance and by observing by polishing element surfaces. Mainly, cracks arose on internal electrode portions and dielectric layer portions near internal electrodes.

TABLE 10

| Organic Compound Added in terms of Pt(mol %) | Number of Occurrence of Cracks n = 100 |
|---|---|
| 0 | 0 |
| 0.01 | 0 |
| 0.03 | 3 |
| 0.05 | 9 |
| 0.08 | 15 |
| 0.1 | 40 |
| 0.3 | 80 |
| 0.5 | 90 |
| 0.8 | 95 |
| 1 | 100 |
| 1.3 | 100 |
| 1.5 | 100 |

As shown in Table 10, it was confirmed that the number of occurrence of cracks increased when adding as an organic metal compound a metal other than Ni by 0.08 mol % or more or 0.1 mol % or more in terms of a Pt amount.

The invention claimed is:

1. An electronic device having an element body comprising an internal electrode layer, wherein
said internal electrode layer contains an alloy;
the alloy contains
nickel (Ni), and
at least one kind of element selected from a group of ruthenium (Ru), rhodium (Rh), rhenium (Re) and platinum (Pt); and
a content of each component is
Ni: 80 to 100 mol % (note that 100 mol % is excluded), and
a total of Ru, Rh, Re and Pt: 0 to 20 mol % (note that 0 mol % is excluded).

2. The electronic device as set forth in claim 1, wherein a content of each component is
Ni: 87 to 99.9 mol %, and
a total of Ru, Rh, Re and Pt: 0.1 to 13 mol %.

3. The electronic device as set forth in claim 1, wherein said alloy includes at least one kind of element selected from the group of rhodium (Rh), rhenium (Re) and platinum (Pt).

4. The electronic device as set forth in claim 1, wherein said internal electrode layer includes an alloy; and
when assuming that peak strength of a diffraction line on a crystal plane (111) is I(111), peak strength of a diffraction line on a crystal plane (200) is I(200), and peak strength of a diffraction line on a crystal plane (220) is I(220), the alloy has a main plane satisfying relationships of $(I(111)/I(200)) \geqq 3$ and $(I(111)/I(220)) \geqq 3$.

5. A production method of an electronic device for producing an electronic device as set forth in claim 1, wherein
a green chip having an internal electrode layer film formed to be a predetermined pattern by a thin film method is fired to produce said element body.

6. The production method of an electronic device as set forth in claim 5, wherein said internal electrode layer film has a crystalline size of 10 to 100 nm.

7. The production method of an electronic device as set forth in claim 5, wherein said internal electrode film is formed by the sputtering method or the evaporation method.

8. The production method of an electronic device as set forth in claim 5, wherein said green chip is fired in an atmosphere having an oxygen partial pressure of $10^{-10}$ to $10^{-2}$ Pa at the temperature of 1000 to 1300° C.

9. The production method of an electronic device as set forth in claim 5, wherein said element body is annealed in an atmosphere having an oxygen partial pressure of $10^{-2}$ to 100 Pa at the temperature of 1200° C. or lower after a step of firing said green chip.

10. An electronic device formed by any one of the methods described in claim 5.

11. A production method of an electronic device for producing an electronic device as set forth in claim 1, wherein:
a green chip having an internal electrode layer film formed to be a predetermined pattern by the printing method using a paste including alloy powder having an average particle diameter of 0.01 to 1 μm is fired to produce said element body.

12. The production method of an electronic device as set forth in claim 11, wherein said alloy powder has a crystalline size of 10 to 100 nm.

13. The production method of an electronic device as set forth in claim 11, wherein said alloy powder is formed by grinding an alloy film formed by the sputtering method or the evaporation method.

14. The production method of an electronic device as set forth in claim 11, wherein said green chip is fired in an atmosphere having an oxygen partial pressure of $10^{-10}$ to $10^{-2}$ Pa at the temperature of 1000 to 1300 ° C.

15. The production method of an electronic device as set forth in claim 11, wherein said element body is annealed in an atmosphere having an oxygen partial pressure of $10^{-2}$ to 100 Pa at the temperature 1200° C. or lower after a step of firing said green chip.

16. An electronic device formed by any one of the methods described in claim 11.

17. A production method of an electronic device for producing an electronic device as set forth in claim 1, wherein:
a green chip having an internal electrode layer film formed to be a predetermined pattern by the printing method using a paste including conductive particles is fired to produce said element body; wherein
said conductive particle includes
a core portion containing nickel as the main component, and a cover layer covering at least a part around said core portion; and said cover layer is composed of a metal or an alloy including as the main component at least one kind of element selected from ruthenium (Ru), rhodium (Rh), rhenium (Re) and platinum (Pt).

18. The production method of an electronic device as set forth in claim 13, wherein said core portion is powder in a spherical shape, a flake shape, a projection form and/or an amorphous shape, wherein a typical length of the particle is in a range of 0.01 µm to 1.0 µm.

19. The production method of an electronic device as set forth in claim 17, wherein a thickness of said cover layer is in a range of 0.1 to 15 nm.

20. A production method of an electronic device for producing an electronic device as set forth in claim 1, comprising the steps of:

forming a sub conductive layer composed of a metal layer or an alloy layer having at least one kind of element selected from ruthenium (Ru), rhodium (Rh), rhenium (Re) and platinum (Pt);

forming a main conductive layer including nickel as the main component by stacking said sub conductive layer; and firing a green chip including an internal electrode layer film comprising said sub conductive layer and main conductive layer.

21. The production method of an electronic device as set forth in claim 17, wherein said main conductive layer is sandwiched between a pair of said sub conductive layers, and said internal electrode layer has the configuration that three or more layers are stacked.

22. The production method of an electronic device as set forth in claim 20, wherein a thickness of said sub conductive layer is more than 0 µm and 0.1 µm or less.

23. The production method of an electronic device as set forth in claim 20, wherein a thickness of said main conductive layer is 0.1 to 1.0 µm.

24. The production method of an electronic device as set forth in claim 20, wherein said sub conductive layer is formed by the thin film forming method, and said main conductive layer is formed by the printing method or the thin film forming method.

* * * * *